(12) United States Patent
Wedding

(10) Patent No.: US 7,157,854 B1
(45) Date of Patent: Jan. 2, 2007

(54) TUBULAR PDP

(75) Inventor: Carol Ann Wedding, Toledo, OH (US)

(73) Assignee: Imaging Systems Technology, Toledo, OH (US)

( * ) Notice: Subject to any disclaimer, the term of this patent is extended or adjusted under 35 U.S.C. 154(b) by 198 days.

(21) Appl. No.: 10/441,104

(22) Filed: May 20, 2003

Related U.S. Application Data

(60) Provisional application No. 60/381,823, filed on May 21, 2002.

(51) Int. Cl.
*H01J 17/49* (2006.01)

(52) U.S. Cl. .................................. 313/582; 313/484

(58) Field of Classification Search ........ 313/582–587, 313/484–487, 234, 607, 493, 634; 315/169.1, 315/169.3
See application file for complete search history.

(56) References Cited

U.S. PATENT DOCUMENTS

| | | |
|---|---|---|
| 2,644,113 A | 6/1953 | Etzkorn |
| 3,050,654 A | 8/1962 | Toulon |
| 3,499,167 A | 3/1970 | Baker et al. |
| 3,559,190 A | 1/1971 | Bitzer |
| 3,602,754 A | 8/1971 | Pfaender et al. |
| 3,603,836 A | 9/1971 | Grier |
| 3,646,384 A | 2/1972 | Lay |
| 3,652,891 A | 3/1972 | Janning |
| 3,654,680 A | 4/1972 | Bode et al. |
| 3,661,615 A | 5/1972 | Gray et al. |
| 3,666,981 A | 5/1972 | Lay |
| 3,704,052 A | 11/1972 | Coleman |
| 3,716,742 A | 2/1973 | Nakayama et al. |
| 3,769,543 A | 10/1973 | Pennebaker |
| 3,801,861 A | 4/1974 | Petty et al. |
| 3,803,449 A | 4/1974 | Schmersal |
| 3,811,061 A | 5/1974 | Nakayama et al. |
| 3,836,810 A | 9/1974 | Johanns et al. |
| 3,848,248 A | 11/1974 | MacIntyre |
| 3,860,846 A | 1/1975 | Mayer |
| 3,885,195 A | 5/1975 | Amano |
| 3,927,342 A | 12/1975 | Bode et al. |
| 3,935,494 A | 1/1976 | Dick et al. |
| 3,946,381 A | 3/1976 | Johnson et al. |
| 3,964,050 A | 6/1976 | Mayer |
| 3,969,718 A | 7/1976 | Strom |
| 3,990,068 A | 11/1976 | Mayer et al. |
| 3,998,618 A | 12/1976 | Kreick et al. |
| 4,027,188 A | 5/1977 | Bergman |
| 4,035,690 A | 7/1977 | Roeber |
| 4,038,577 A | 7/1977 | Bode et al. |
| 4,060,749 A | 11/1977 | Shinada et al. |
| 4,063,131 A | 12/1977 | Miller |

(Continued)

OTHER PUBLICATIONS

James Rutherfurd, Author "PDP With Improved Drive Performance at Reduced Cost" 9th International Display Workshops IDW 02 Hiroshima, Japan, Dec. 2, 2002, pp. 837 to 840 Above Paper Enclosed- Discloses Positive Column Discharge and Cited on p. 7 of Patent Application.

*Primary Examiner*—Joseph Williams
(74) *Attorney, Agent, or Firm*—Donald K. Wedding; Jim Zegeer

(57) ABSTRACT

There is disclosed a gas discharge plasma display device comprising one or more ionizable gas filled elongated tubes. In one embodiment, the device is operated as a positive column gas discharge display. In another embodiment, the display is a monolithic or single substrate display.

42 Claims, 13 Drawing Sheets

U.S. PATENT DOCUMENTS

| | | | |
|---|---|---|---|
| 4,080,597 | A | 3/1978 | Mayer et al. |
| 4,081,712 | A | 3/1978 | Bode et al. |
| 4,087,805 | A | 5/1978 | Miller |
| 4,087,807 | A | 5/1978 | Miavecz |
| 4,106,009 | A | 8/1978 | Dick |
| 4,126,809 | A | 11/1978 | Wedding et al. |
| 4,127,807 | A | 11/1978 | Peplow et al. |
| 4,164,678 | A | 8/1979 | Biazzo et al. |
| 4,233,623 | A | 11/1980 | Pavliscak |
| 4,303,732 | A | 12/1981 | Torobin |
| 4,320,412 | A | 3/1982 | Hynes et al. |
| 4,349,456 | A | 9/1982 | Sowman |
| 4,494,038 | A | 1/1985 | Wedding et al. |
| 4,611,203 | A | 9/1986 | Criscimagna et al. |
| 4,638,218 | A | 1/1987 | Shinoda et al. |
| 4,683,470 | A | 7/1987 | Criscimagna et al. |
| 4,737,687 | A | 4/1988 | Shinoda et al. |
| 4,827,186 | A | 5/1989 | Knauer et al. |
| 4,926,095 | A | 5/1990 | Shinoda et al. |
| 4,963,792 | A | 10/1990 | Parker |
| 5,075,597 | A | 12/1991 | Salavin et al. |
| 5,107,182 | A | 4/1992 | Sano et al. |
| 5,182,489 | A | 1/1993 | Sano et al. |
| 5,326,298 | A | 7/1994 | Hotomi |
| 5,446,344 | A | 8/1995 | Kanazawa |
| 5,514,934 | A * | 5/1996 | Matsumoto et al. ........ 313/607 |
| 5,541,479 | A | 7/1996 | Nagakubi |
| 5,541,618 | A | 7/1996 | Shinoda |
| 5,640,068 | A | 6/1997 | Amemiya et al. |
| 5,661,500 | A | 8/1997 | Shinoda et al. |
| 5,663,741 | A | 9/1997 | Kanazawa |
| 5,674,553 | A | 10/1997 | Shinoda et al. |
| 5,724,054 | A | 3/1998 | Shinoda |
| 5,736,815 | A | 4/1998 | Amemiya |
| 5,742,122 | A | 4/1998 | Amemiya et al. |
| 5,745,086 | A | 4/1998 | Weber |
| 5,786,794 | A | 7/1998 | Kishi et al. |
| 5,793,158 | A | 8/1998 | Wedding |
| 5,914,563 | A | 6/1999 | Lee et al. |
| 5,952,782 | A | 9/1999 | Nanto et al. |
| 5,984,747 | A | 11/1999 | Bhagavatula et al. |
| 6,034,657 | A | 3/2000 | Tokunaga et al. |
| 6,097,358 | A | 8/2000 | Hirakawa et al. |
| 6,184,848 | B1 | 2/2001 | Weber |
| 6,198,476 | B1 | 3/2001 | Hong et al. |
| 6,208,081 | B1 | 3/2001 | Eo et al. |
| 6,255,777 | B1 | 7/2001 | Kim et al. |
| 6,288,693 | B1 | 9/2001 | Song et al. |
| RE37,444 | E | 11/2001 | Kanazawa |
| 6,376,995 | B1 | 4/2002 | Kato et al. |
| 6,414,435 | B1 * | 7/2002 | Akiba ........................ 313/584 |
| 6,492,776 | B1 | 12/2002 | Rutherford |
| 6,528,952 | B1 | 3/2003 | Kato et al. |
| 6,545,422 | B1 | 4/2003 | George et al. |
| 6,570,335 | B1 | 5/2003 | George et al. |
| 6,612,889 | B1 | 9/2003 | Green et al. |
| 6,620,012 | B1 | 9/2003 | Johnson et al. |
| 6,630,916 | B1 | 10/2003 | Shinoda |
| 6,633,117 | B1 | 10/2003 | Shinoda et al. |
| 6,646,388 | B1 | 11/2003 | George et al. |
| 6,650,055 | B1 | 11/2003 | Ishimoto et al. |
| 6,653,993 | B1 | 11/2003 | Nagao et al. |
| 6,677,704 | B1 * | 1/2004 | Ishimoto et al. ............ 313/493 |
| 6,693,389 | B1 | 2/2004 | Marcotte et al. |
| 6,738,033 | B1 | 5/2004 | Hibino et al. |
| 6,762,566 | B1 | 7/2004 | George et al. |
| 6,764,367 | B1 | 7/2004 | Green et al. |
| 6,768,478 | B1 | 7/2004 | Wani et al. |
| 6,791,264 | B1 | 9/2004 | Green et al. |
| 6,794,812 | B1 | 9/2004 | Yamada et al. |
| 6,796,867 | B1 | 9/2004 | George et al. |
| 6,801,001 | B1 | 10/2004 | Drobot et al. |
| 6,822,626 | B1 | 11/2004 | George et al. |
| 6,836,063 | B1 | 12/2004 | Ishimoto et al. |
| 6,836,064 | B1 | 12/2004 | Yamada et al. |
| 6,841,929 | B1 | 1/2005 | Ishimoto et al. |
| 6,853,144 | B1 | 2/2005 | Marcotte |
| 6,857,923 | B1 | 2/2005 | Yamada et al. |
| 6,864,631 | B1 * | 3/2005 | Wedding ..................... 313/587 |
| 6,893,677 | B1 | 5/2005 | Yamada et al. |
| 6,900,598 | B1 | 5/2005 | Hibino et al. |
| 6,902,456 | B1 | 6/2005 | George et al. |
| 6,914,382 | B1 | 7/2005 | Ishimoto et al. |
| 6,917,351 | B1 | 7/2005 | Velayudhan et al. |
| 6,930,442 | B1 | 8/2005 | Awamoto et al. |
| 6,932,664 | B1 | 8/2005 | Yamada et al. |
| 6,935,913 | B1 | 8/2005 | Wyeth et al. |
| 6,969,292 | B1 | 11/2005 | Tokai et al. |
| 6,975,068 | B1 | 12/2005 | Green et al. |
| 6,985,125 | B1 | 1/2006 | Velayudhan et al. |
| 7,005,793 | B1 | 2/2006 | George et al. |
| 7,014,522 | B1 * | 3/2006 | Hibino et al. ................. 445/25 |
| 7,025,648 | B1 | 4/2006 | Green et al. |
| 7,049,748 | B1 | 5/2006 | Tokai et al. |
| 2001/0028216 | A1 | 10/2001 | Tokai et al. |
| 2002/0017863 | A1 | 2/2002 | Kim et al. |
| 2003/0182967 | A1 | 10/2003 | Tokai et al. |
| 2004/0004445 | A1 | 1/2004 | George et al. |
| 2004/0033319 | A1 | 2/2004 | Yamada et al. |
| 2004/0063373 | A1 | 4/2004 | Johnson et al. |
| 2004/0106349 | A1 | 6/2004 | Green et al. |
| 2005/0115495 | A1 | 6/2005 | Yamada et al. |

* cited by examiner

| Electrical Map | Data Electrodes | | | | | | | | | | |
|---|---|---|---|---|---|---|---|---|---|---|---|
| | I1 | I2 | I3 | I4 | I5 | I6 | I7 | I8 | I9 | | |
| | m1 | m2 | m3 | m4 | m5 | m6 | m7 | m8 | m9 | | |
| Address Electrodes (scan electrodes) n1 | n1,I1 | n1,I2 | n1,I3 | n1,I4 | n1,I5 | n1,I6 | n1,I7 | n1,I8 | n1,I9 | R1 | Rows |
| n2 | n2,I1 | n2,I2 | n2,I3 | n2,I4 | n2,I5 | n2,I6 | n2,I7 | n2,I8 | n2,I9 | R2 | |
| n3 | n3,I1 | n3,I2 | n3,I3 | n3,I4 | n3,I5 | n3,I6 | n3,I7 | n3,I8 | n3,I9 | R3 | |
| n4 | n4,I1 | n4,I2 | n4,I3 | n4,I3 | n4,I5 | n4,I6 | n4,I7 | n4,I8 | n4,I9 | R4 | |
| n5 | n5,m1 | n5,m2 | n5,m3 | n5,m4 | n5,m5 | n5,m6 | n5,m7 | n5,m8 | n5,m9 | R5 | |
| n6 | n6,m1 | n6,m2 | n6,m3 | n6,m4 | n6,m5 | n6,m6 | n6,m7 | n6,m8 | n6,m9 | R6 | |
| n7 | n7,m1 | n7,m2 | n7,m3 | n7,m4 | n7,m5 | n7,m6 | n7,m7 | n7,m8 | n7,m9 | R7 | |
| n8 | n8,m1 | n8,m2 | n8,m3 | n8,m4 | n8,m5 | n8,m6 | n8,m7 | n8,m8 | n8,m9 | R8 | |
| | C1 | C2 | C3 | C4 | C5 | C6 | C7 | C8 | C9 | | |
| | Column | | | | | | | | | Physical Map | |

| Scan | Physical Map | | | | | | | | |
|---|---|---|---|---|---|---|---|---|---|
| 1 | R1,C1 | R1,C2 | R1,C3 | R1,C4 | R1,C5 | R1,C6 | R1,C7 | R1,C8 | R1,C9 |
| | R5,C1 | R5,C2 | R5,C3 | R5,C4 | R5,C5 | R5,C6 | R5,C7 | R5,C8 | R5,C9 |
| 2 | R2,C1 | R2,C2 | R2,C3 | R2,C4 | R2,C5 | R2,C6 | R2,C7 | R2,C8 | R2,C9 |
| | R6,C1 | R6,C2 | R6,C3 | R6,C4 | R6,C5 | R6,C6 | R6,C7 | R6,C8 | R6,C9 |

Figure 6A

| Electrical Map | Data Electrodes | | | | | | | | | | |
|---|---|---|---|---|---|---|---|---|---|---|---|
| | m1 | m2 | m3 | m4 | m5 | m6 | m7 | m8 | m9 | | |
| Address Electrodes (scan electrodes) n1 | n1,m1 | n3,m2 | n1,m3 | n3,m4 | n1,m5 | n3,m6 | n1,m7 | n3,m8 | n1,m9 | R1 | Rows |
| n2 | n2,m1 | n4,m2 | n2,m3 | n4,m4 | n2,m5 | n4,m6 | n2,m7 | n4,m8 | n2,m9 | R2 | |
| n3 | n3,m1 | n1,m2 | n3,m3 | n1,m4 | n3,m5 | n1,m6 | n3,m7 | n1,m8 | n3,m9 | R3 | |
| n4 | n4,m1 | n2,m2 | n4,m3 | n2,m3 | n4,m5 | n2,m6 | n4,m7 | n2,m8 | n4,m9 | R4 | |
| n5 | n5,m1 | n7,m2 | n5,m3 | n7,m4 | n5,m5 | n7,m6 | n5,m7 | n7,m8 | n5,m9 | R5 | |
| n6 | n6,m1 | n8,m2 | n6,m3 | n8,m4 | n6,m5 | n8,m6 | n6,m7 | n8,m8 | n6,m9 | R6 | |
| n7 | n7,m1 | n5,m2 | n7,m3 | n5,m4 | n7,m5 | n5,m6 | n7,m7 | n5,m8 | n7,m9 | R7 | |
| n8 | n8,m1 | n6,m2 | n8,m3 | n6,m3 | n8,m5 | n6,m6 | n8,m7 | n6,m8 | n8,m9 | R8 | |
| | C1 | C2 | C3 | C4 | C5 | C6 | C7 | C8 | C9 | | |
| | Column | | | | | | | | | Physical Map | |

| Scan | Physical Map | | | | | | | | |
|---|---|---|---|---|---|---|---|---|---|
| n1 | R1,C1 | R3,C2 | R1,C3 | R3,C4 | R1,C5 | R3,C6 | R1,C7 | R3,C8 | R1,C9 |
| n2 | R2,C1 | R4,C2 | R2,C3 | R4,C4 | R2,C5 | R4,C6 | R2,C7 | R4,C8 | R2,C9 |
| n3 | R3,C1 | R1,C2 | R3,C3 | R1,C4 | R3,C5 | R1,C6 | R3,C7 | R1,C8 | R3,C9 |
| n4 | R4,C1 | R2,C2 | R4,C3 | R2,C4 | R4,C5 | R2,C6 | R4,C7 | R2,C8 | R4,C9 |

Figure 6B

| Electrical Map | Data Electrodes | | | | | | | | | |
|---|---|---|---|---|---|---|---|---|---|---|
| | m1 | m2 | m3 | m4 | m5 | m6 | m7 | m8 | m9 | |
| Address Electrodes (scan electrodes) n1 | n1,m1 | n4,m2 | n3,m3 | n2,m4 | n1,m5 | n4,m6 | n3,m7 | n2,m8 | n1,m9 | R1 |
| n2 | n2,m1 | n1,m2 | n4,m3 | n3,m4 | n2,m5 | n1,m6 | n4,m7 | n3,m8 | n2,m9 | R2 |
| n3 | n3,m1 | n2,m2 | n1,m3 | n4,m4 | n3,m5 | n2,m6 | n1,m7 | n4,m8 | n3,m9 | R3 |
| n4 | n4,m1 | n3,m2 | n2,m3 | n1,m4 | n4,m5 | n3,m6 | n2,m7 | n1,m8 | n4,m9 | R4 |
| n5 | n5,m1 | n8,m2 | n7,m3 | n6,m4 | n5,m5 | n8,m6 | n7,m7 | n6,m8 | n5,m9 | R5 |
| n6 | n6,m1 | n5,m2 | n8,m3 | n7,m4 | n6,m5 | n5,m6 | n8,m7 | n7,m8 | n6,m9 | R6 |
| n7 | n7,m1 | n6,m2 | n5,m3 | n8,m4 | n7,m5 | n6,m6 | n5,m7 | n8,m8 | n7,m9 | R7 |
| n8 | n8,m1 | n7,m2 | n6,m3 | n5,m4 | n8,m5 | n7,m6 | n6,m7 | n5,m8 | n8,m9 | R8 |
| | C1 | C2 | C3 | C4 | C5 | C6 | C7 | C8 | C9 | |
| | Column | | | | | | | | | Physical Map |

| Scan | Physical Map | | | | | | | | |
|---|---|---|---|---|---|---|---|---|---|
| n1 | R1,C1 | R2,C2 | R3,C3 | R4,C4 | R1,C5 | R2,C6 | R3,C7 | R4,C8 | R1,C9 |
| n2 | R2,C1 | R3,C2 | R4,C3 | R1,C4 | R2,C5 | R3,C6 | R4,C7 | R1,C8 | R2,C9 |
| n3 | R3,C1 | R4,C2 | R1.C3 | R2,C4 | R3,C5 | R4,C6 | R1,C7 | R2,C8 | R3,C9 |
| n4 | R4,C1 | R1,C2 | R2,C3 | R3,C4 | R4,C5 | R1,C6 | R2,C7 | R3,C8 | R4,C9 |

Figure 6C

TUBULAR PDP

RELATED PATENT APPLICATION

This application claims priority under 35 USC 119(e) of Provisional Patent Application 60/381,823 filed May 21, 2002.

FIELD OF THE INVENTION

This invention relates to a gas discharge plasma display using elongated tubes and a process for production of same. This invention is particularly suitable for single substrate structures and for flexible or bendable displays.

BACKGROUND OF THE INVENTION

In a gas discharge plasma display, a single addressable picture element is a cell, sometimes referred to as a pixel. The cell element is defined by two or more electrodes positioned in such a way so as to provide a voltage potential across a gap containing an ionizable gas. When sufficient voltage is applied across the gap, the gas ionizes to produce light. In an AC gas discharge plasma display, the electrodes at a cell site are coated with a dielectric. The electrodes are generally grouped in a matrix configuration to allow for selective addressing of each cell, subcell, pixel or subpixel. As used herein, cell or pixel means cell, subcell, pixel or subpixel.

To form a display image, several types of voltage pulses may be applied across a plasma display cell gap. These pulses include a write pulse, which is the voltage potential sufficient to ionize the gas at the pixel site. A write pulse is selectively applied across selected cell sites. The ionized gas will produce visible light, or UV light which excites a phosphor to glow. Sustain pulses are a series of pulses that produce a voltage potential across pixels to maintain ionization of cells previously ionized. An erase pulse is used to selectively extinguish ionized pixels.

The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display, it is desired that the various physical parameters adhere to various tolerances. Maintaining the tolerances depends on cell geometry, fabrication methods and the materials used. The prior art discloses a variety of plasma display structures, a variety of methods of construction, and a variety of materials.

Examples of gas discharge (plasma) devices contemplated in the practice of this invention include both monochrome (single color) AC plasma displays and multi-color (two or more colors) AC plasma displays.

Examples of monochrome AC gas discharge (plasma) displays are well known in the prior art and include those disclosed in U.S. Pat. No. 3,559,190 issued to Bitzer et al., U.S. Pat. No. 3,499,167 (Baker et al), U.S. Pat. No. 3,646,384 (Lay) U.S. Pat. No. 3,860,846 (Mayer) U.S. Pat. No. 3,964,050 (Mayer), U.S. Pat. No. 4,080,597 (Mayer) and U.S. Pat. No. 4,126,807 (Wedding), all incorporated herein by reference.

Examples of multicolor AC plasma displays are well known in the prior art and include those disclosed in U.S. Pat. No. 4,233,623 issued to Pavliscak, U.S. Pat. No. 4,320,418 (Pavliscak), U.S. Pat. No. 4,827,186 (Knauer, et al.), U.S. Pat. No. 5,661,500 (Shinoda et al.), U.S. Pat. No. 5,674,553 (Shinoda, et al.), U.S. Pat. No. 5,107,182 (Sano et al.), U.S. Pat. No. 5,182,489 (Sano), U.S. Pat. No. 5,075,597 (Salavin et al), U.S. Pat. No. 5,742,122 (Amemiya, et al.), U.S. Pat. No. 5,640,068 (Amemiya et al.), U.S. Pat. No. 5,736,815 (Amemiya), U.S. Pat. No. 5,541,479 (Nagakubi), U.S. Pat. No. 5,745,086 (Weber) and U.S. Pat. No. 5,793,158 (Wedding), all incorporated herein by reference.

Examples of single-substrate or monolithic plasma display panel structures are disclosed by U.S. Pat. No. 3,646,384 (Lay), U.S. Pat. No. 3,860,846 (Mayer), and U.S. Pat. No. 3,964,050 (Mayer), all cited above and incorporated herein by reference. These may be monochrome or multicolor.

This invention may be practiced in a DC gas discharge (plasma) display which is well known in the prior art, for example as disclosed in U.S. Pat. No. 3,886,390 (Maloney et al.), U.S. Pat. No. 3,886,404 (Kurahashi et al.), U.S. Pat. No. 4,035,689 (Ogle et al.) and U.S. Pat. No. 4,532,505 (Holz et al.), all incorporated herein by reference.

This invention will be described with reference to an AC plasma display. The PDP industry has used two different AC plasma display panel (PDP) structures, the two-electrode columnar discharge structure and the three-electrode surface discharge structure.

The two-electrode columnar discharge display structure is disclosed in U.S. Pat. No. 3,499,167 (Baker et al) and U.S. Pat. No. 3,559,190 (Bitzer et al.) The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge structure has been widely used in monochrome AC plasma displays that emit orange or red light from a neon gas discharge.

Phosphors may be used in a monochrome structure to obtain a color other than neon orange.

In a multi-color columnar discharge (PDP) structure as disclosed in U.S. Pat. No. 5,793,158 (Wedding), phosphor stripes or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP.

In a two electrode columnar discharge PDP as disclosed by Wedding 158, each light emitting pixel is defined by a gas discharge between a bottom or rear electrode x and a top or front opposite electrode y, each cross-over of the two opposing arrays of bottom electrodes x and top electrodes y defining a pixel or cell.

The three-electrode multi-color surface discharge AC plasma panel structure is widely disclosed in the prior art including U.S. Pat. Nos. 5,661,500 and 5,674,553, both issued to Tsutae Shinoda et al of Fujitsu Limited; U.S. Pat. No. 5,745,086 issued to Larry F. Weber of Plasmaco and Matsushita; and U.S. Pat. No. 5,736,815 issued to Kimio Amemiya of Pioneer Electronic Corporation, all of which are incorporated herein by reference.

In a surface discharge PDP, each light emitting pixel or cell is defined by the gas discharge between two electrodes on the top substrate. In a multi-color RGB display, the pixels or cells may be called sub-pixels or sub-cells. Photons from the discharge of an ionizable gas at each pixel or sub-pixel excite a photoluminescent phosphor that emits red, blue, or green light.

In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also called a row sustain electrode because of its dual functions of address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate.

In a three-electrode surface discharge AC plasma display panel, the sustaining voltage and resulting gas discharge occurs between the electrode pairs on the top or front viewing substrate above and remote from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode. Because the phosphor is spaced from the discharge between the two electrodes on the top substrate, the phosphor is subject to less electron bombardment than in a columnar discharge PDP.

This invention particularly relates to the use of tubes containing an ionizable gas in a gas discharge plasma display positioned on a single substrate or monolithic structure. The single substrate display may comprise a two electrodes columnar structure or a three (or more) electrodes surface discharge structure. Single-substrate or monolithic plasma display panels structures are disclosed by U.S. Pat. No. 3,646,384 (Lay), U.S. Pat. No. 3,860,846 (Mayer), U.S. Pat. No. 3,964,050 (Mayer), U.S. Pat. No. 4,106,009 (Dick), U.S. Pat. No. 4,164,678 (Biazzo et al), and U.S. Pat. No. 4,638,218 (Shinoda et al), all incorporated herein by reference.

RELATED PRIOR ART

PDP Tubes

The following prior art relates to the use of tubes in a PDP and is incorporated herein by reference.

U.S. Pat. No. 3,602,754 (Pfaender et al.) discloses a multiple discharge gas display panel in which filamentary or capillary size glass tubes are assembled and formed as a monolayer to form a gas discharge panel.

U.S. Pat. No. 3,654,680 (Bode et al), U.S. Pat. No. 3,927,342 (Bode et al) and U.S. Pat. No. 4,038,577 (Bode et al) disclose a gas discharge display in which filamentary or capillary size gas tubes are assembled to form a gas discharge panel.

U.S. Pat. No. 3,969,718 (Strom) discloses a plasma display system utilizing tubes arranged in a side by side, parallel fashion.

U.S. Pat. No. 3,990,068 (Mayer et al) discloses a capillary tube plasma display with a plurality of capillary tubes arranged parallel in a close pattern.

U.S. Pat. No. 4,027,188 (Bergman) discloses a tubular plasma display consisting of parallel glass capillary tubes sealed in a plenum and attached to a rigid substrate.

U.S. Pat. No. 5,984,747 (Bhagavatula et al.) discloses rib structures for containing plasma in electronic displays are formed by drawing glass performs into fiber-like rib components. The rib components are then assembled to form rib/channel structures suitable for flat panel displays.

US Patent Application 2001/0028216A1 (Tokai et al.) discloses a group of elongated illuminators in a gas discharge device.

U.S. Pat. No. 6,255,777 (Kim et al) and US Patent Application 2002/0017863 (Kim et al) of Plasmion disclose a capillary electrode discharge PDP device and a method of fabrication.

U.S. Pat. No. 6,545,422 (George et al) discloses a PDP with a plurality of micro-components in a socket and sandwiched between two substrates.

RELATED PRIOR ART

Positive Dischage

The following prior art related to positive column discharge and is incorporated herein by reference.

U.S. Pat. No. 6,184,848 (Weber) discloses the generation of a "positive column" plasma discharge wherein the plasma discharge evidences a balance of positively charged ions and electrons. The PDP discharge operates using the same fundamental principal as a fluorescent lamp, i.e., a PDP employs ultraviolet light generated by a gas discharge to excite visible light emitting phosphors. Weber discloses an inactive isolation bar.

*PDP With Improved Drive Performance at Reduced Cost* by James Rutherford, Huntertown, Ind., Proceedings of the Ninth International Display Workshops, Hiroshima, Japan, Dec. 4–6, 2002, discloses an electrode structure and electronics for a "positive column" plasma display. Rutherford discloses the use of the isolation bar as an active electrode.

SUMMARY OF THE INVENTION

In accordance with the practice of this invention, the gas discharge space within a gas discharge plasma display device comprises one or more elongated tubes, each tube containing an ionizable gas mixture capable of forming a gas discharge when a sufficient voltage is applied to opposing electrodes in close proximity to the tube.

As used herein elongated tube is intended to include capillary, filament, filamentary, illuminator, hollow rods, or other such terms. It includes an elongated enclosed gas-filled structure having a length dimension which is greater than its cross-sectional width dimension. The width of the tube is the viewing width from the top or bottom (front or rear) of the display.

In one embodiment, this invention comprises elongated tubes containing ionizable gas in a monochrome or multicolor gas discharge (plasma) display wherein photons from the gas discharge within a tube excite a phosphor such that the phosphor emits light in the visible and/or invisible spectrum. The invention is described hereinafter with reference to a plasma display panel (PDP) in an AC gas discharge (plasma) display.

The practice of this invention provides a tubular AC plasma display device with a robust cell structure that is free from problems associated with dimensional tolerance requirements in the prior art.

The practice of this invention also provides for plasma display devices to be produced with simple alignment methods using non-rigid, flexible substrates such as polymers or plastics.

The practice of this invention provides for low cost manufacturing processes such as continuous roll manufacturing processes by separating the manufacture of the light producing tube elements from the manufacture of the substrate.

The practice of this invention provides for the simultaneous addressing of multiple rows of pixels without physically dividing or separating the display screen as is done with conventional plasma displays.

This invention provides for the improved priming or conditioning of pixels.

The practice of this invention provides for the reduction of false contour that is often observed in a standard plasma display.

The practice of this invention also provides for a positive column plasma gas discharge device having increased brightness and improved luminous efficiency.

DESCRIPTION OF THE SEVERAL VIEWS OF THE DRAWINGS

FIGS. 6A, 6B, 6C are tables mapping electrode connections to physical locations.

DETAILED DESCRIPTION

Figure 1A:
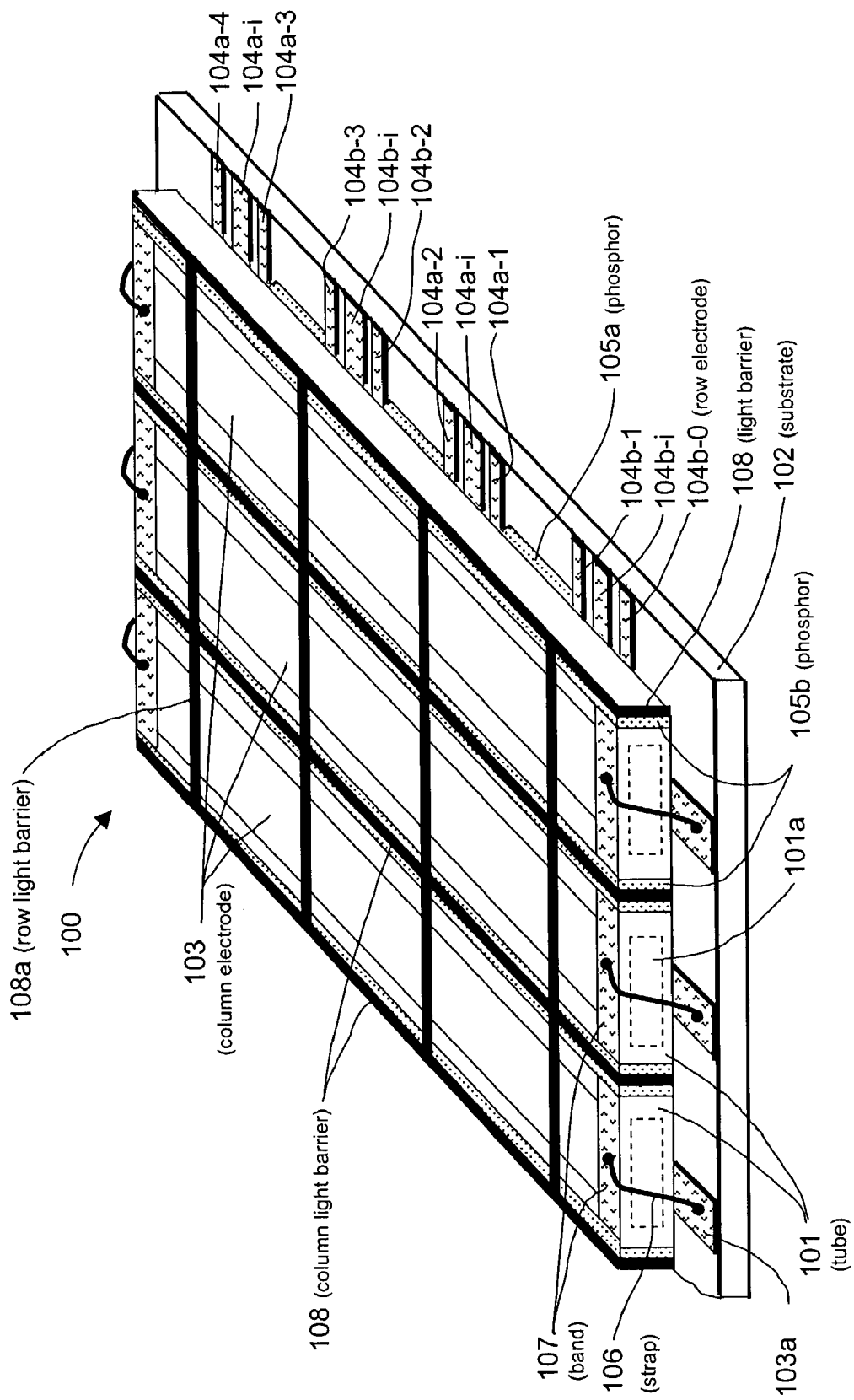
FIG. 1A is a prospective of a monolithic or single substrate positive column discharge AC plasma display with ionizable gas filled elongated tubes.

FIG. 1A is a top view of a positve column discharge AC plasma discharge display 100 comprising multiple gas-filled hollow rectangular capillary tubes 101, assembled on a single substrate 102 to form the plasma display panel 100. This embodiment uses rectangular cross-section tubes 101 made from a material with a high UV transmission factor such as optical grade clear fused quartz. Such capillary tubes are commercially available in standard and custom sizes and shapes with internal dimensions of 100 micron or larger and wall thickness of 25 microns or larger. The capillary tubes 101 are evacuated and filled with an appropriate ionizing gas mixture and then sealed using a plug 101a as shown or sealed by any other suitable means including heat fusion. The exterior top surface of tube 101 contains a column electrode 103 which can be of a transparent material such as ITO. Connection to this electrode 103 is made through a physically robust conductive ring or band 107 at the end of each tube 101. The conductive band 107 is connected to electrode pad 103a by conductive strap 106. Other connective methods may also be used including conductive bonding. The two sides of the rectangular tube 101 adjacent to column electrode 103 contain phosphor 105b. The distance between these two sides is the rectangular tube width as viewed by the observer from the top or bottom of the display. In a circular tube, this would be the diameter. The phosphor may be added during tube manufacture or after positioning of the tube on the substrate 102. The substrate 102 contains row electrodes 104, electrode pads 103a and phosphor pads 105a. The flat surface of the tube 101 is arranged to make intimate contact with the flat surface of the row electrodes 104 and the phosphor 105a.

The row electrodes 104 comprise 104b-0 and 104b-1 with a passive or inactive isolation bar 104b-1, 104a-1 and 104a-2 with isolation bar 104a-1, 104b-2 and 104b-3 with isolation bar 104b-i, and 104a-3 and 104a-4 with isolation bar 104a-i. The positive column discharge takes place along the length of the tube between adjacent row electrodes such as 104b-1 and 104a-1, 104a-2 and 104b-2, 104b-3 and 104a-3. The isolation bars help contain the positive column discharge and prevent spreading of the discharge down the tube.

The discharge provides photons which excite phosphor 105a and 105b with the excited phosphor emitting visible light which can be viewed from the top through the transparent column electrodes 103 between column light barriers 108 and row light barriers 108a. The top column electrodes 103 may have a split, window, or ladder structure. Likewise, conductive bus bars (not shown) may be located along one or both edges of the transparent electrodes 103.

In one panel fabrication embodiment, tubes 101 of the desired length are bonded to a continuous web substrate 102, the substrate having a plurality of row electrodes 104 oriented perpendicular to the column electrodes 103. Pixels are defined by the intersections of electrodes 103 and 104, the relative relationship of which is not constrained to a precise position of the electrode 103 in its length-wise direction. The matching flat geometry of the rectangular tubes 101 and the substrate row electrodes 104 provides precise electrode 104 definition and orientation relative to each tube 101 without forming the electrodes 104 on the tubes 101. This arrangement accommodates high tolerance capillary tube alignment during manufacture and avoids critical registration of tube electrodes and substrate electrodes as required in the prior art.

Figure 1B:
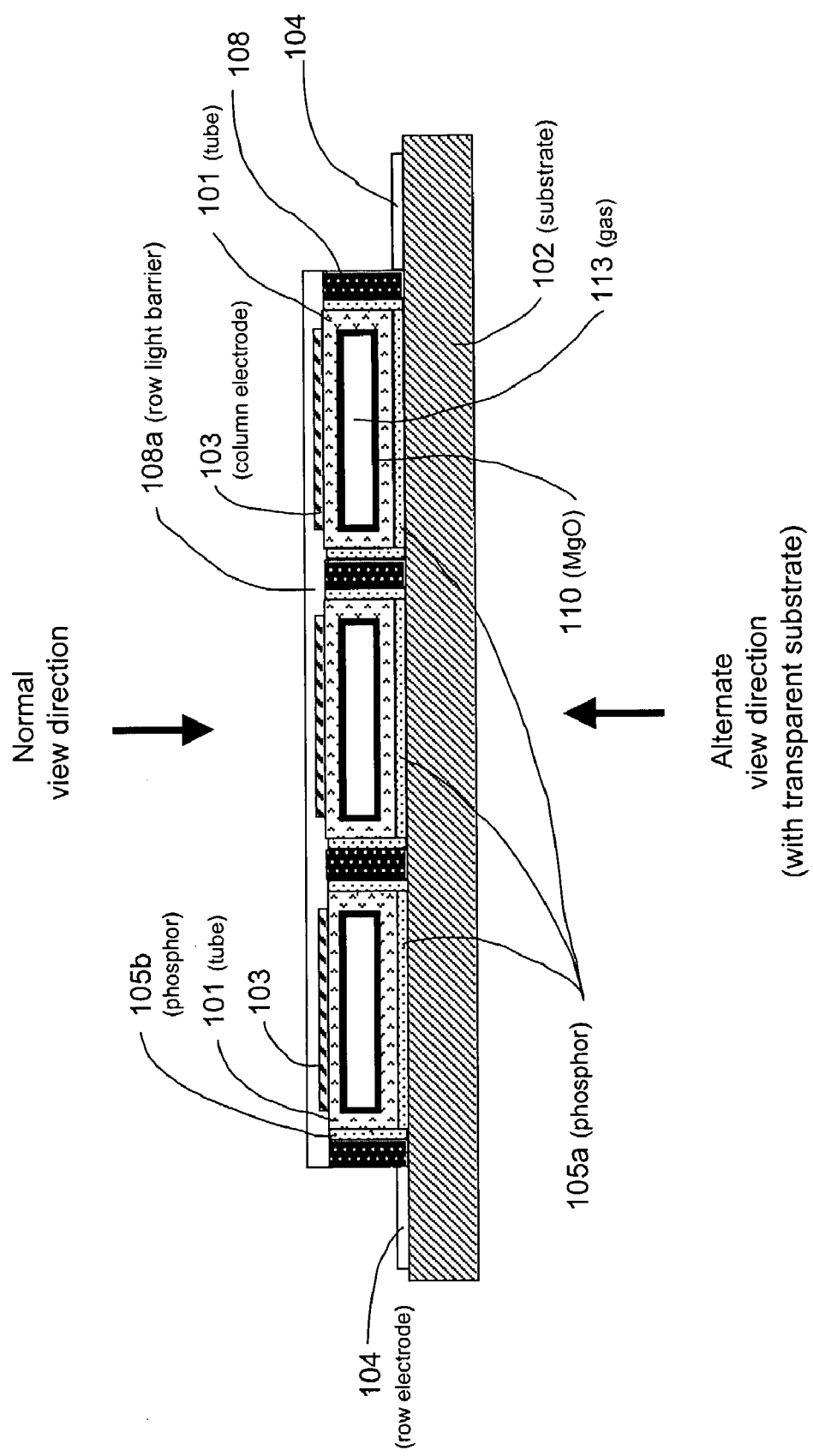
FIG. 1B is a section of the single substrate and elongated tubes in FIG. 1A.

FIG. 1B shows a section of the tubes 101 assembled on substrate 102. To facilitate the discharge process, all or a portion of the inside of each capillary tube is coated with a thin layer of MgO 110 prior to gas processing and sealing. The optical grade clear fused quartz tube is highly transparent to UV light allowing the phosphor 105a and 105b to be placed on the outside of the tube while being excited by the UV transmission through each tube. The combined effect of 105*b* and 105*a* is a phosphor channel on the outside of the tube inside of which the UV light is generated. Further a very thin layer of phosphor (not shown) may also be applied over the top column electrode 103 to enhance the appearance of the visible light generated by a sub-pixel. Placing phosphor outside the plasma discharge capillary serves to protect the phosphor from the gas discharge and direct ion and electron impingement thereby helping to prolong the life of the phosphor and the plasma display. Added light barriers 108 may be provided between each tube 101 to prevent light optical cross-talk between pixels. In one preferred embodiment, ink jet deposition may be used to adhere phosphor either to the substrate or the tubes, before or after tube/substrate assembly. Ink jet deposition facilitates the continuous panel fabrication process by precise programmable application of phosphor to the tubes and substrate. For example, both the phosphor 105*b* and the opaque light barrier 108 can be built-up in place by applying successive layers of material by ink jet. This process is sometimes referred to as 3-D printing or stereolithography. The process provides a programmable flexibility in panel fabrication to accommodate different configurations and sizes of panels on one automated continuous substrate web production machine. Also, shown in FIG. 1B is the normal panel viewing direction from the top. However, the glass substrate 102 can also be used to permit viewing from the opposite side. When a glass substrate is used and viewed from the substrate side, the glass substrate forms a natural barrier to protect the more fragile capillary tubes from inadvertent physical damage when in use.

In accordance with one embodiment and best mode of this invention, the AC plasma display with elongated tubes as illustrated in FIGS. 1A and 1B is operated in the positive column region of the gas discharge. U.S. Pat. No. 6,184,848 (Weber) discloses the advantages of operation in the positive column region and is incorporated herein by reference.

Figure 2A:
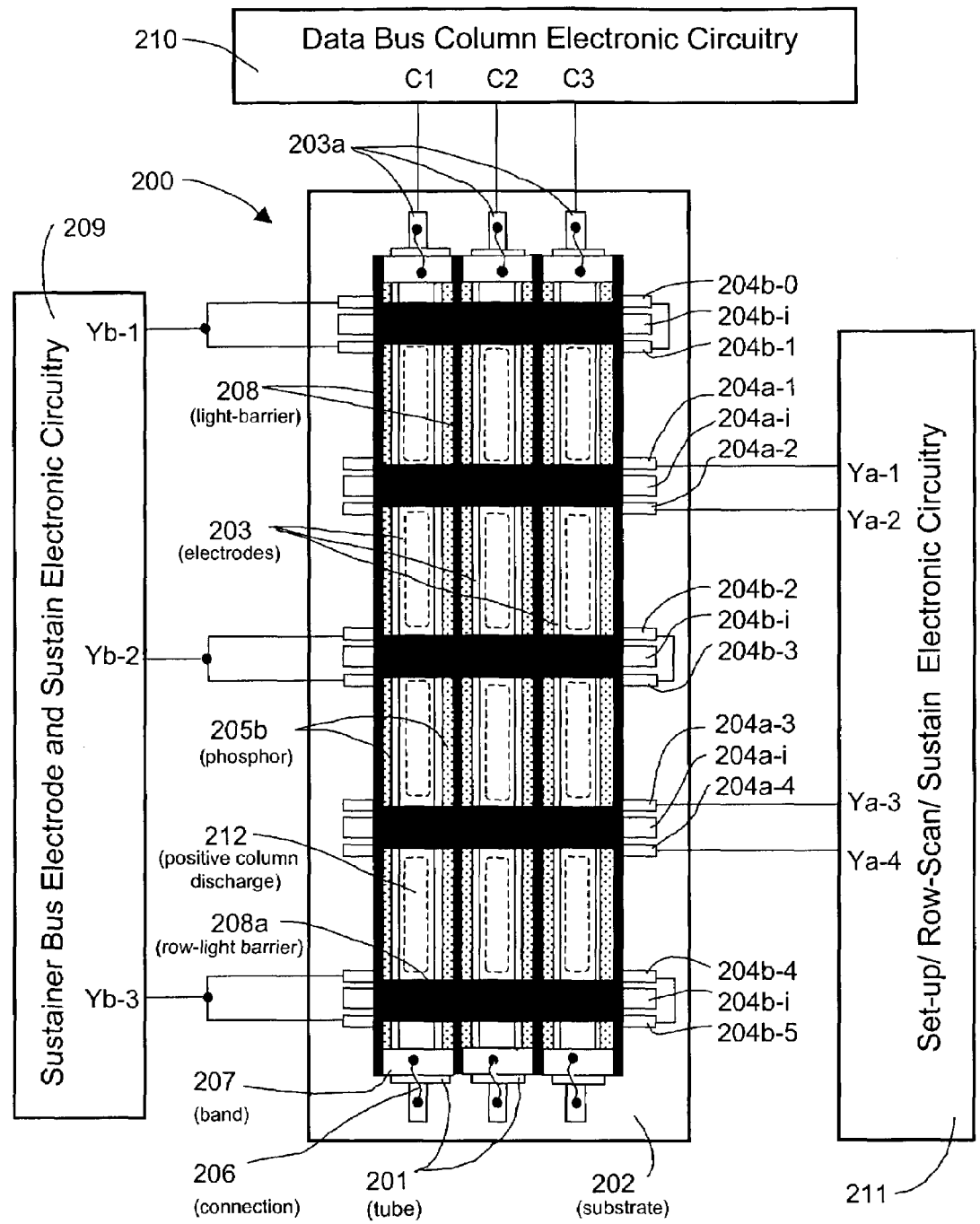
FIG. 2A is a top view of a single substrate positive column discharge AC plasma display with ionizable gas filled elongated tubes and drive electronics with an inactive isolation bar.
Figure 2B:
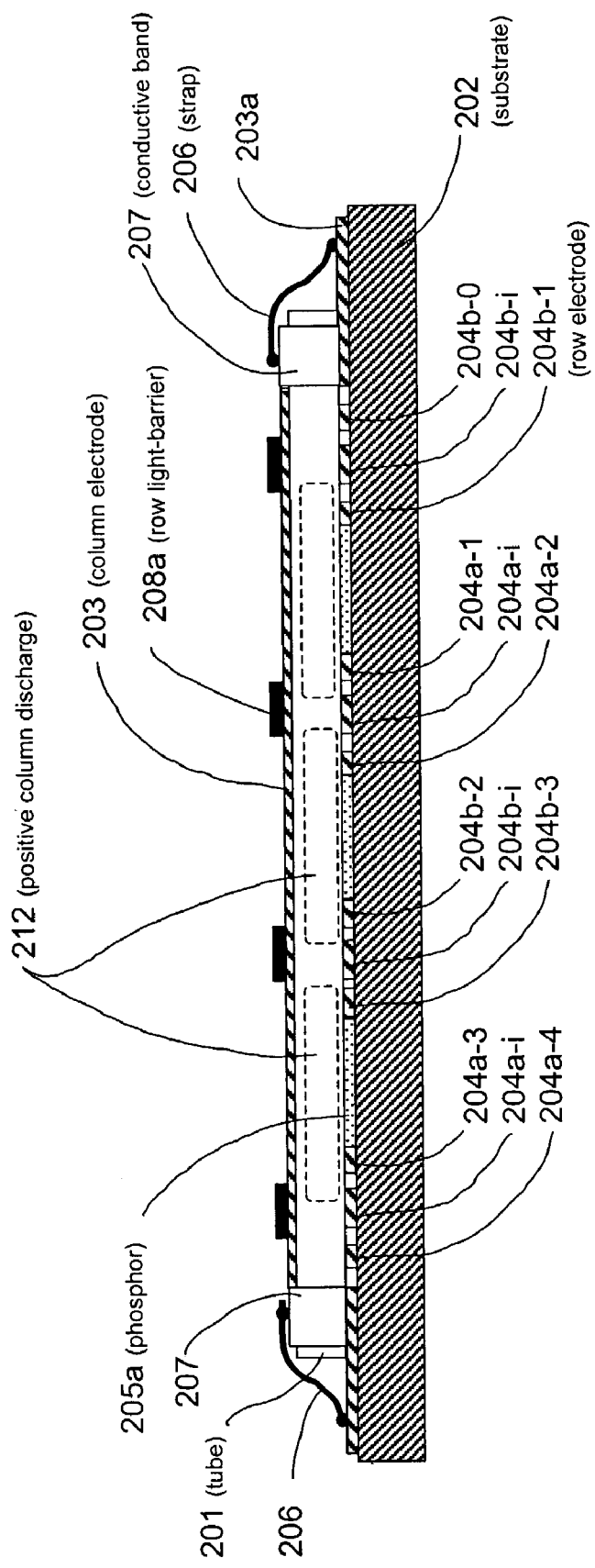
FIG. 2B is a section of the single substrate and elongated tubes in FIG. 2A.

FIGS. 2A and 2B show a monolithic or single substrate postive column discharge AC plasma panel 200 with drive electronics 209, 210 and 211 arranged for positive column discharge UV illumination of phosphor 205*a* and 205*b*. This embodiment of capillary tube display panels overcomes isolation and barrier problems associated with prior art dual substrate glass sandwich display panels with positive column UV emission as disclosed in Weber 848. Glass sandwich dual substrate displays require a precision network of barrier ribs between the glass panel sheets to laterally confine the long positive column discharge path. Barrier defects can adversely affect display panel manufacturing yield, display operation, and display appearance.

The tube configuration and structure of the present invention provides ideal lateral confinement of the long discharge without the disadvantages of the prior art. Positive column discharge can have a UV conversion efficiency of be 80% as opposed to 30% percent for the prior art. Consequently, a positive column discharge can produce an 80% total efficiency as compared to only 15% efficiency for traditional negative glow discharge. The combination of high UV output positive column discharge, high UV emitting ionizable gas, and UV transmissive glass provides for a very high intensity UV illumination of each pixel and phosphor. High UV illumination of the phosphor translates to a bright visible light and a bright display panel. Capillary tubes 201 with column data electrodes 203 are arranged perpendicular to the electrodes 204*a*, 204*b* on single substrate 202. The intersections of electrodes 203 and 204 define display pixels. The substantial separation of electrodes 204*a* and 204*b* along the direction of electrodes 203 defines the positive column discharge area along the length and inside of the tube 201. Each electrode 203 is connected via conductive band 207 and conductive strap 206 to electrode pad 203*a* which is connected to data bus column electrode circuitry 210. Each pair of row electrodes 204*a* or 204*b* forms a loop inside of which there is an electrically conductive isolation bar 204*a-i* or 204*b-i*. Each pair of electrodes 204*b* is separated by isolation bar 204*b-i* and is connected to the sustain bus electronic circuitry 209. Each pair of electrodes 204*a* is separated by isolation bar 204*a-i* and is connected to a set-up scan sustain electronic circuitry 211. As described in Weber 848, a plurality of loops 204*b* each of which comprise a pair of parallel electrodes is interleaved between pairs of single scan electrodes 204*a*. The isolation bars are optional and may be used to insure that there is no significant discharge activity in the inter pixel gap. Typically the isolation bars are conductive. When appropriate sustain signals are applied, pixel illumination selectively occurs between adjoining scan and sustain electrodes by virtue of positive column discharges. The discharges at an ON pixel "ping pong" between one discharge cell which exists at the intersection of a sustain electrode and an address electrode, and a second discharge cell which exists at a scan electrode and the address electrode. In this embodiment, the pixel pitch is on the order of 1320 microns with sustain electrode width of 100 microns and a sustain gap on the order of 700 microns. The present invention is ideal for the long discharge path required for positive column discharge. The tube configuration provides lateral confinement of the long discharge to eliminate pixel cross-talk. At the same time the present invention provides optimal sustain to address electrode spacing of about 110 microns to eliminate the need for excessive high drive voltage and excessively low gas pressure.

FIG. 2B illustrates the long 700 micron positive column discharge 212 between sustain electrodes 204*a* and 204*b*. The cavity formed on the substrate 202 by the height of the electrodes 204 and the space between them is filled with phosphor pad 205*a*. Weber 848 discloses this space as being 28 mils wide. This phosphor pad 205*a* spans the underside pixel tube discharge area. The vertical tube sidewalls may also be coated with phosphor 205*b*. This arrangement efficiently captures the UV emissions of the positive column discharge 212 from three sides of a channel. High UV light output and phosphor placement provide high display visible light output. Light barriers 208 and 208*a* may be located between pixels to minimize light cross-talk.

Figure 3A:
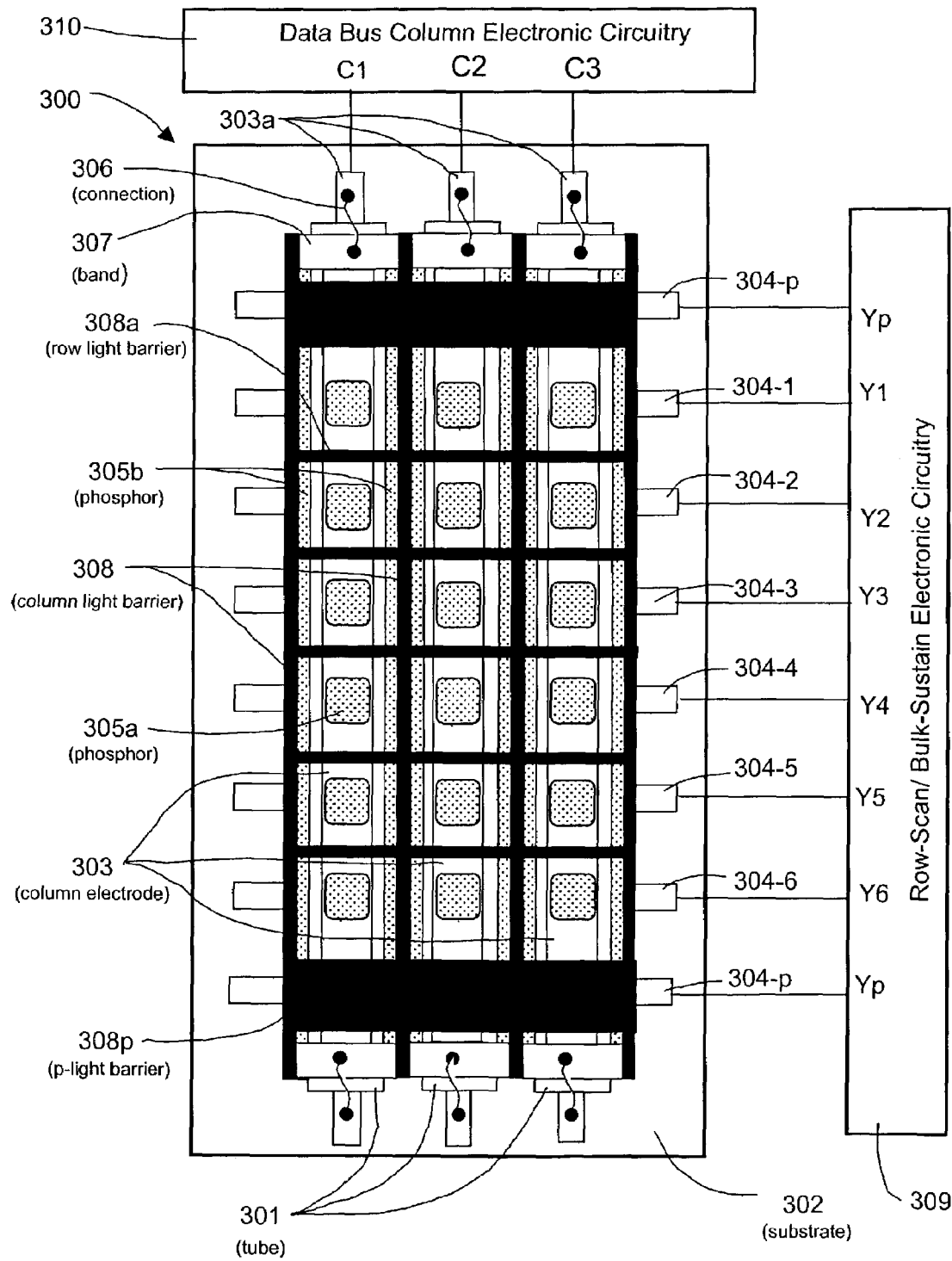
FIG. 3A is a top view of a single substrate columnar discharge AC plasma display with ionizable gas filled elongated tubes and drive electronics.
Figure 3B:
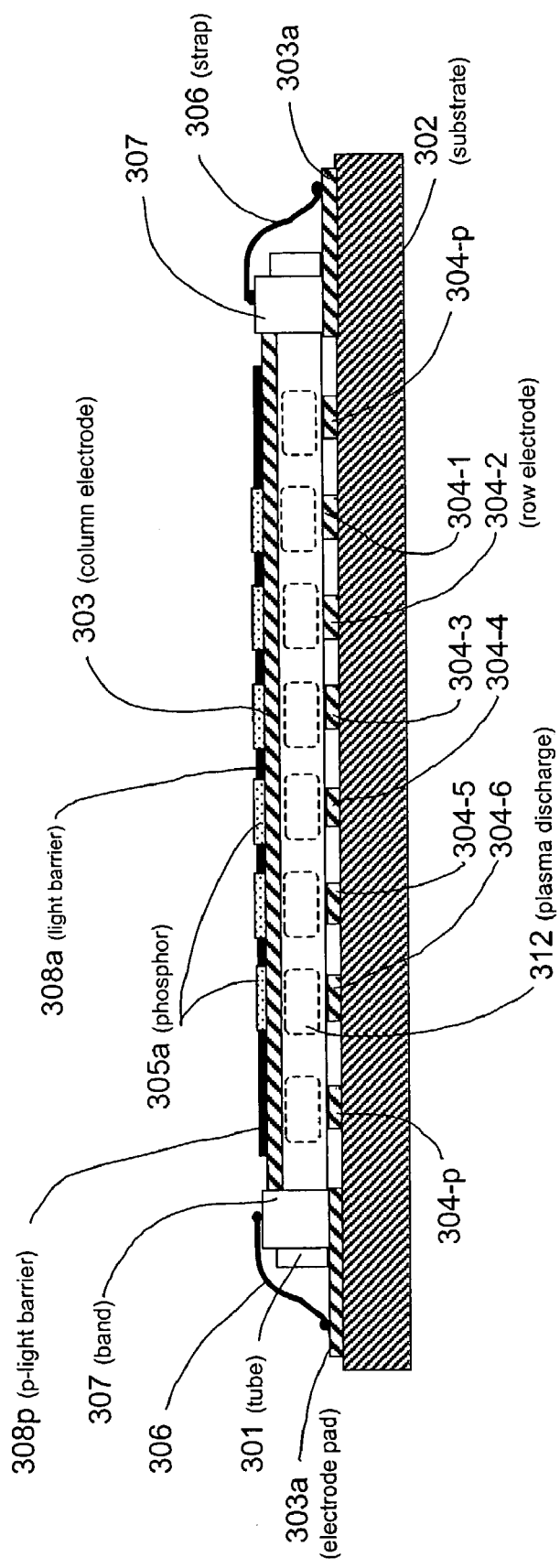
FIG. 3B is a section of the single substrate and elongated tubes in FIG. 3A.

FIGS. 3A and 3B show a single substrate columnar discharge AC plasma display 300 with electronics 309 and 310 arranged for columnar plasma discharge. Each column electrode 303 is connected via conductive band 307 and conductive strap 306 to electrode pad 303*a* which is connected to data bus electronic circuitry 310. Electrodes 304 are connected to electronic circuitry 309. FIG. 3B shows plasma discharge 312 directly between electrodes 303 and 304. This discharge provides UV photons to the surrounding phosphor 305*a* and 305*b*. Also shown are single substrate 302, tube 301, pilot or conditioning electrodes 304-*p*, pilot light barriers 308*p*, and light barriers 308,308*a*.

Figure 4A:
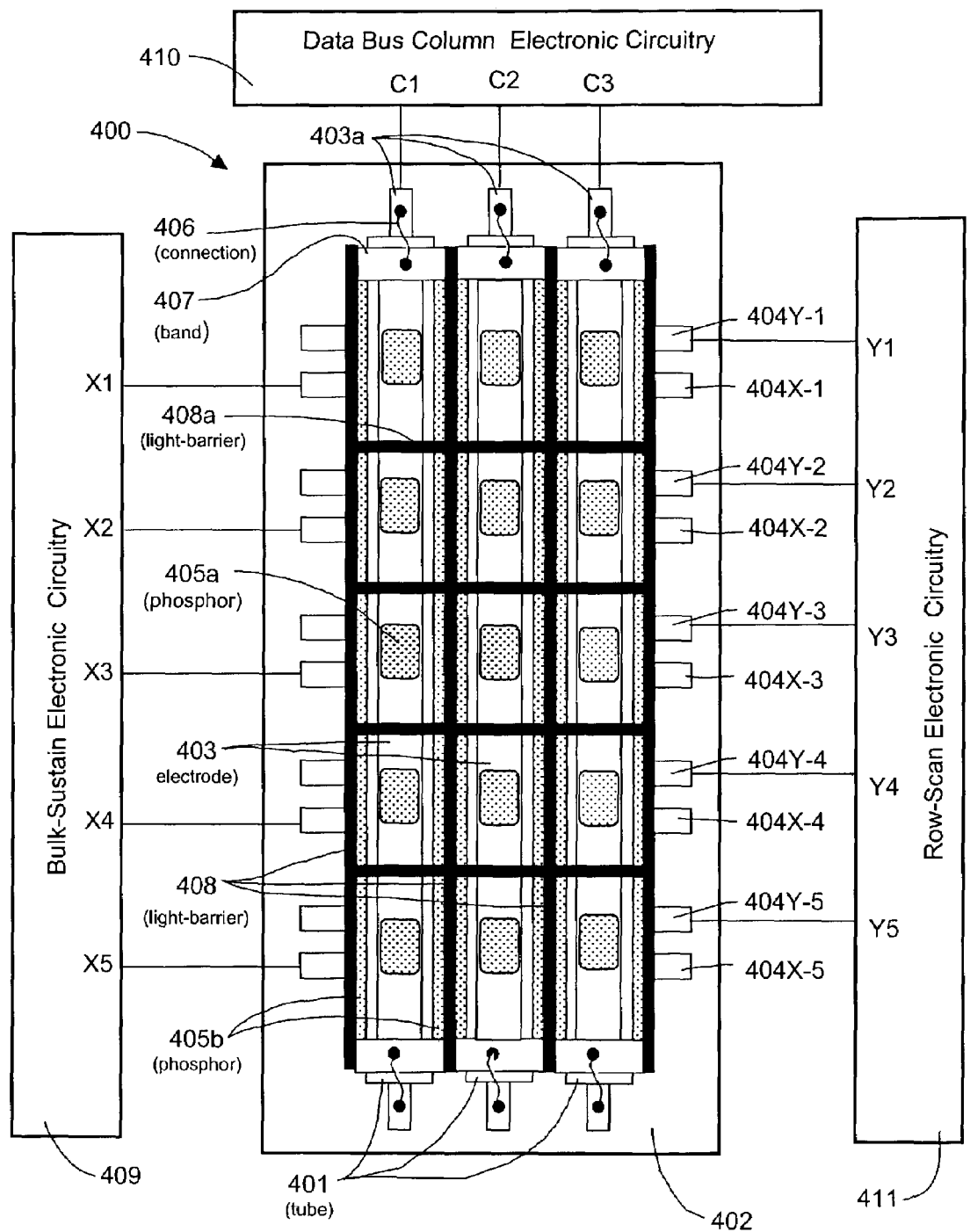
FIG. 4A is a top view of a single substrate surface discharge AC plasma display with ionizable gas filled elongated tubes and drive electronics.
Figure 4B:
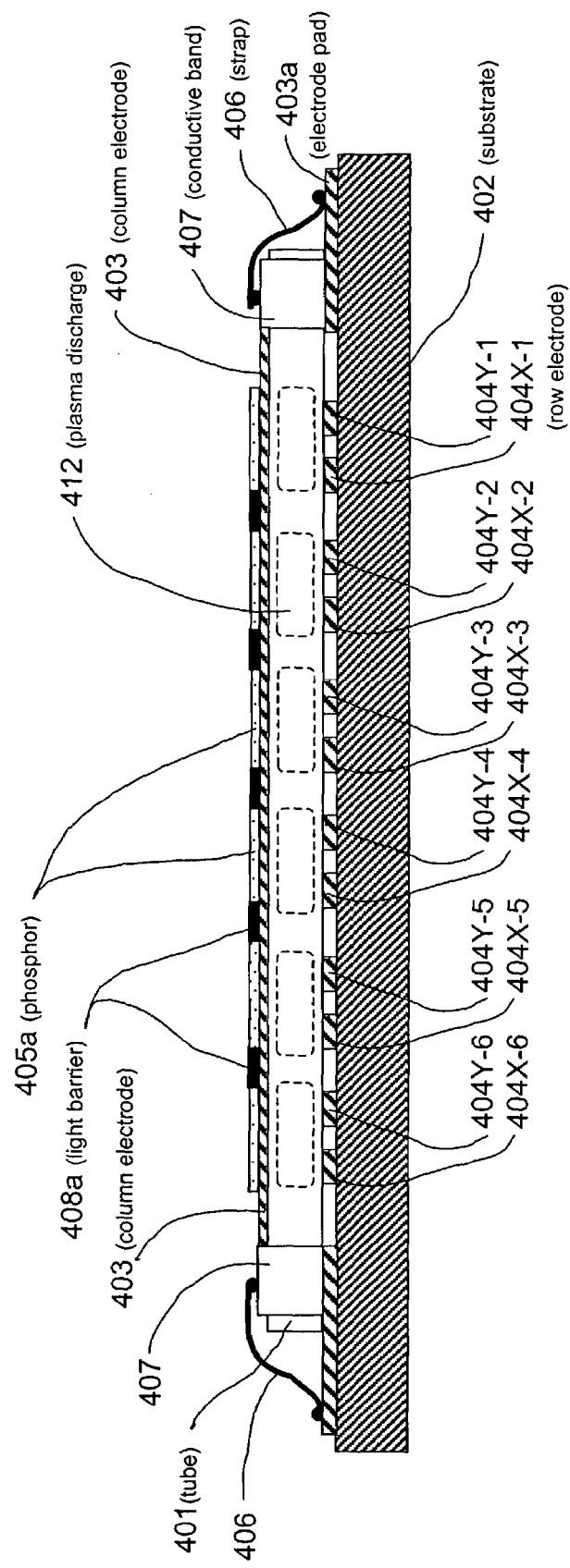
FIG. 4B is a section of the single substrate and elongated tubes in FIG. 4A.

FIGS. 4A and 4B show a single substrate surface discharge AC plasma display panel 400 with electronics 409, 410 and 411 arranged for surface discharge. Each column data electrode 403 is connected via conductive band 407 and conductive strap 406 to electrode pad 403*a* which is connected to electronic circuitry 410. The electrodes 404X and 404Y are connected to row scan electronics 411 and sustain electronics 409 such that once a cell discharge is initiated by the data bus electrode 403, the discharge will be sustained between the 404X and 404Y electrodes. FIG. 4B shows the plasma discharge 412 directly between electrodes 403 and 404 which provides UV illumination of the surrounding phosphor 405a and 405b. Also shown are substrate 402, tube 401, and light barriers 408, 408a.

Figure 5:
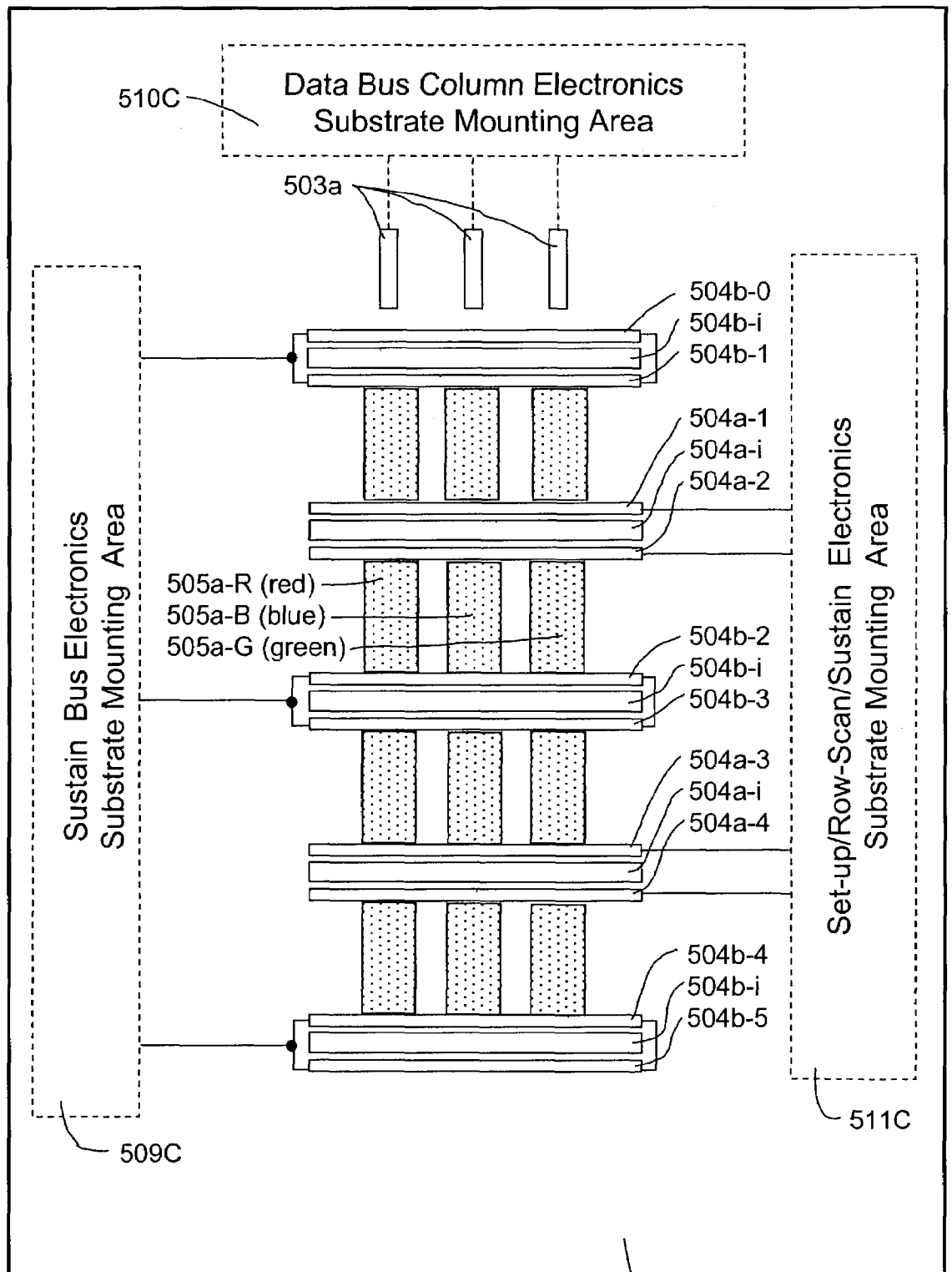
FIG. 5 is a top view of a single substrate positive column discharge AC plasma display substrate illustrating RGB phosphors locations before the tubes are positioned on the substrate.

FIG. 5 shows a single substrate 502 without tubes attached. The substrate 502 has set-up sustain electrodes 504a and loop sustain electrodes 504b as well as electrode pads 503a to facilitate connection to the capillary tube electrodes and drive electronics. Triads of red, blue and green phosphor 505a-R, 505a-B, 505a-G may be applied by programmable inkjet printing. Inkjet printing may be used for the precision deposition of adhesives, dielectrics and other materials for automated continuous web manufacture of large display panels.

A standard plasma display is addressed one row at a time. The addressing of each row takes a finite amount of time. In order to maintain a flicker free image, the display must be updated at video rates. Therefore there is a practical limit as to how many rows a plasma display may have. In order to achieve more rows with a plasma display, often the column electrodes are split at the center of the display and the two halves are addressed from the top and from the bottom as two independent displays. This is referred to in the PDP industry as dual scan.

This can be achieved with a tube display by simply adding another electrode layer for additional column electrodes. FIG. 6A is a table that maps physical address of the display against the internal electrode configuration in the case where the number of data electrodes has been doubled. One set of data electrodes are represented as l1 through l9, and a second set of electrodes parallel to l1 through l9, but on a different plane are represented as m1 through m9. Each set of these data electrodes connects to a unique subset of tubes defined by a unique set of rows. For example the Table in FIG. 6A shows l1 through l9 only connecting only to rows R1 through R4 and m1 through m9 connecting only to rows n5 though n8. This allows two rows to be addressed simultaneously. In one row scan time, two rows are addressed simultaneously. Although the concept was illustrated with two rows begin addressed simultaneously, the concept is expandable to more then two rows. By addressing two or more rows at a time, the display may be refreshed faster.

In a standard plasma display gray shades are achieved by time multiplexing. The brightness of a pixel is proportional to how many sustains pulses it experiences while in the 'on' state. One frame is composed of sub-fields with varying numbers of sustains. The subfields may be summed in various combinations to achieve the full compliment of unique gray levels (usually 256) Two problems that occur with this technique are false contour and motion artifact. In general both of these artifacts occur because the human eye does not integrate the subfields properly. There are several ways to alleviate this problem including increasing the update speed as described above. Another way is to separate the pixels that are changing to allow the eye to integrate over an area. By physically separating the pixels that are being addressed changes will be less obvious to the observer. This may be done with a tube display by taking advantage of the ability to have electrodes on multiple layers.

FIG. 6B and FIG. 6C shows tables that maps the physical address of the display with the electrode address. In FIG. 6B the address electrodes attach in a zig-zag pattern. For example address electrode n4 alternates between Row 4 and Row 2. When n4 is selected to be scanned spheres at (R4,C1), (R2,C2), and (R4, C4) are addressed. The pixels are physically separated in a crosshatch pattern. FIG. 6C shows an alternative pattern in which the pixels are physically shifted in a diagonal pattern.

In one embodiment of this invention as illustrated in FIGS. 6A, 6B, 6C, one portion or section of the display is addressed while another portion or section is sustained. This is referred to as Simultaneous Address and Sustain (SAS).

In accordance with the electrode connections of FIGS. 6A, 6B, and 6C, multilayers of cells or pixels may be used to randomize the presentation of cells that are written simultaneously.

Present PDPs allow only a single layer of metallization so each writing event addresses a line of adjacent contiguous cells somewhere on the PDP. Multi layers allow the crossstrap of the individual panel cells or pixels so that cells written in the writing event may not be in a single line but may be written on different lines at the same time. Consequently one may write different PDP sections at the same time and also write in such a way that no two adjacent cells are addressed at the same time anywhere on the panel.

This randomizes any concentration of light flashes on the display and mitigates sources of complaint as to artifacts.

Figure 8:
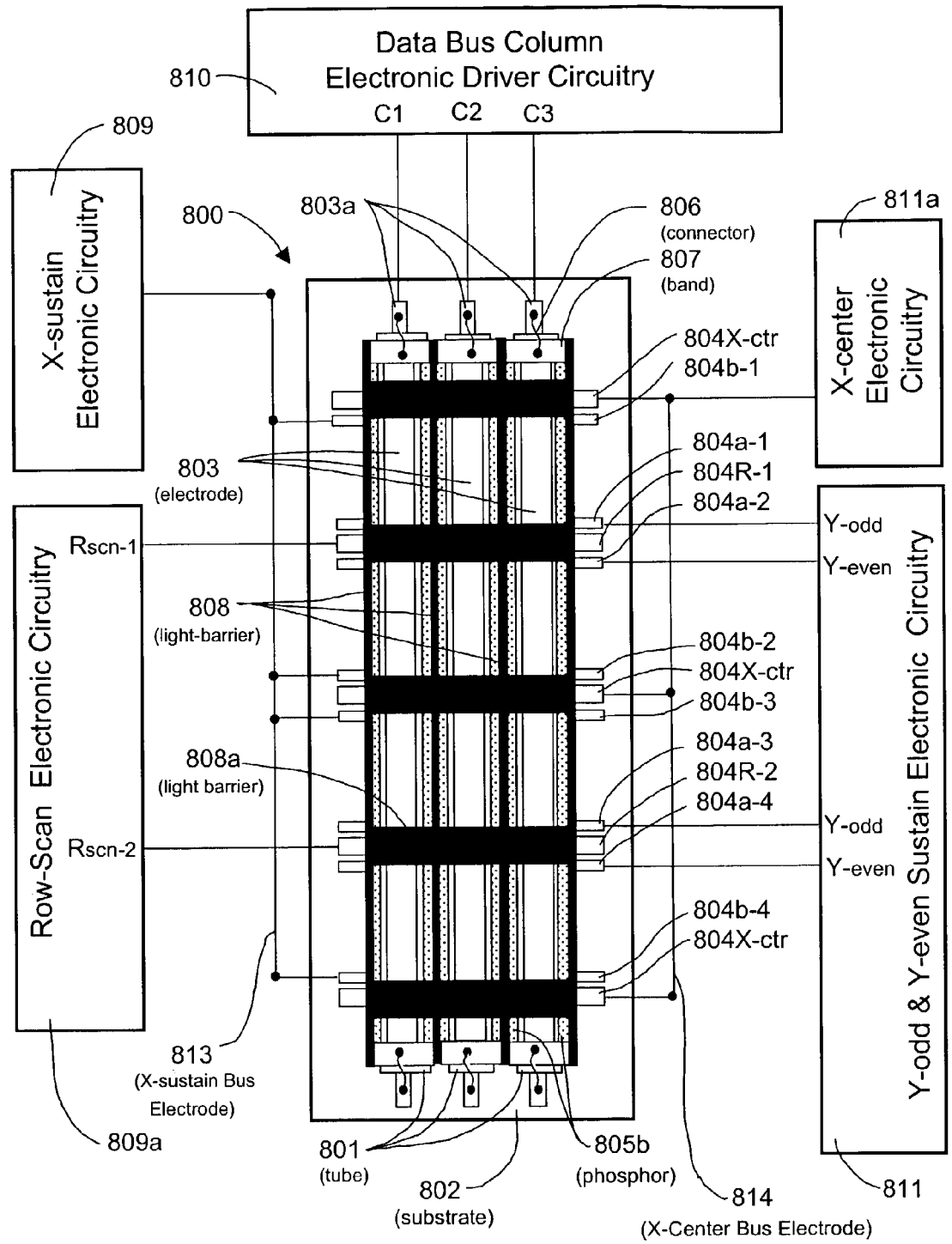
FIG. 8 is a top view of a single substrate positive column discharge AC plasma display with ionizable gas filled elongated tubes and drive electronics using the isolation bar as an active electrode.

FIG. 8 shows an elongated capillary tube panel 800 arranged for "positive column discharge" UV illumination of phosphor including enhanced performance and reduced cost support electronic circuitry 809, 809a, 811, 811a, and 810.

As described in the Rutherford IDW 2002 paper, Y-odd and Y-even sustain row electrodes 804a-1 and 804a-2, etc. are connected to Y-odd and Y-even sustain electronic driver circuits 811 with wide row scan electrodes 804R-1, etc. arranged in the space between them and connected to row-scan electronic driver circuits 809a.

X-sustain row electrode pairs 804b-2 and 804b-3, etc. are connected to X-sustain bus electronic circuits 809, with wide X-center electrodes 804-ctr arranged in the space between them and connected to X-center electronic driver circuit 811a.

A plurality of Y-odd and Y-even sustain row electrodes pairs 804a-1 and 804a-2, etc. are interleaved between a plurality of X-sustain row electrode pairs 804b-2 and 804b-3, etc.

Column electrodes 803 are connected via conductive bands 807 and conductive straps 806 to electrode pads 803a which are connected to data bus electronic circuitry 810.

Light barriers 808 may be provided between each tube to prevent light cross-talk between column sub-pixels. Light barriers 808a may be provided over tubes 801 and electrodes 803 to block light between row sub-pixels.

The two sides of each elongated rectangular tube 801 adjacent to electrode 803 are coated with phosphor 805b. Also shown are substrate 802 and tube 801

Figure 7:
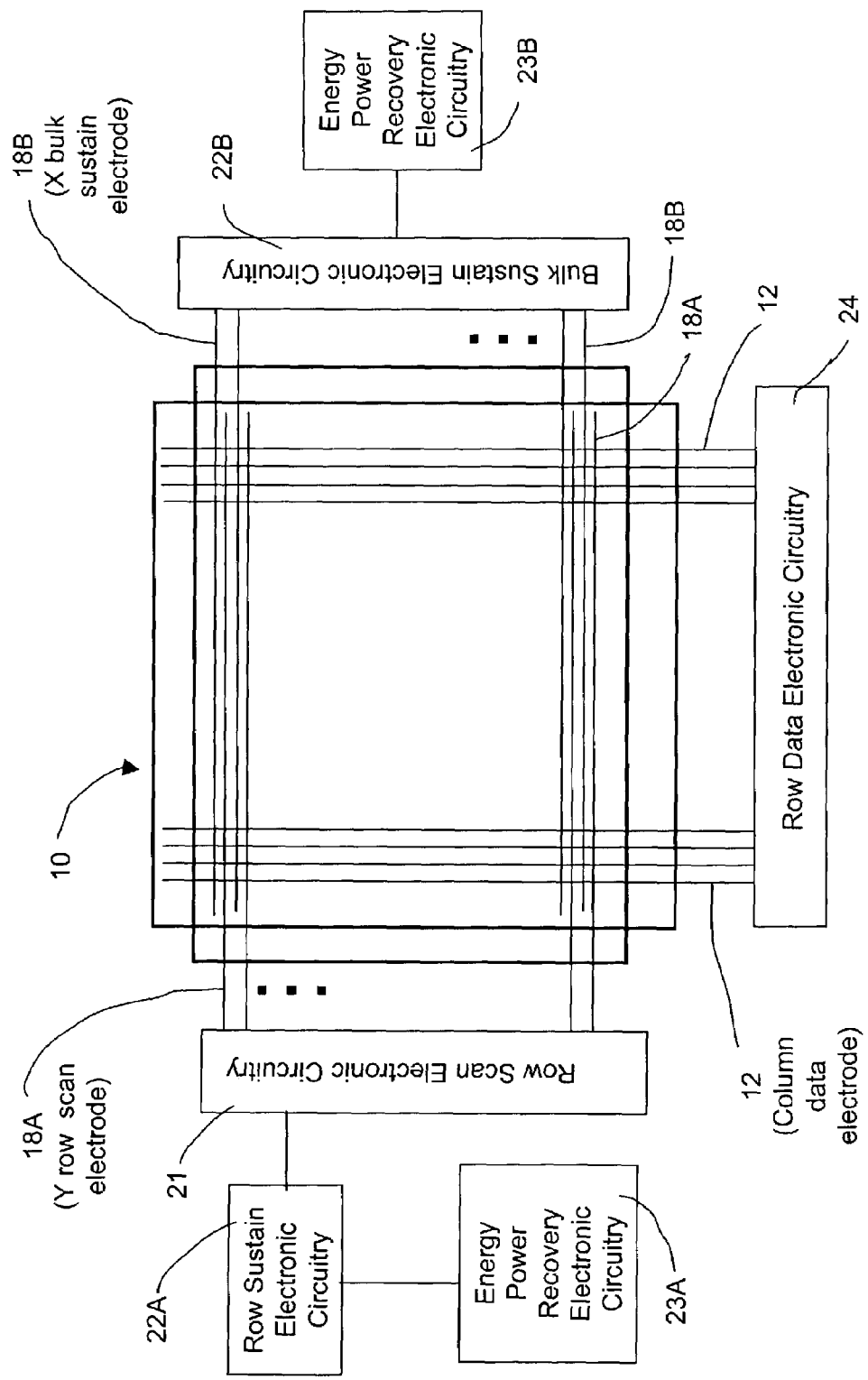
FIG. 7 shows a block diagram of electronics with energy power recovery for driving a surface discharge AC gas discharge plasma display with tubes.

FIG. 7 is a block diagram of a surface discharge AC display panel 10 with electronic circuitry 21 for y row scan electrodes 18A, bulk sustain electronic circuitry 22B for x bulk sustain electrode 18B and column data electronic circuitry 24 for the column data electrodes 12. The panel 10 contains an array of elongated tubes (not shown) as disclosed herein. This may be a monolithic or single substrate surface discharge PDP or a dual substrate (coplanar) surface discharge PDP.

There is also shown row sustain electronic circuitry 22A with an energy power recovery electronic circuit 23A. There is also shown energy power recovery electronic circuitry 23B for the bulk sustain electronic circuitry 22B.

A basic electronics architecture for addressing and sustaining a surface discharge AC plasma display is called Address Display Separately (ADS). The ADS architecture may be used for a monochrome or multicolor display. The ADS architecture is disclosed in a number of Fujitsu patents including U.S. Pat. Nos. 5,541,618 and 5,724,054, both issued to Shinoda of Fujitsu Ltd., Kawasaki, Japan. Also see U.S. Pat. No. 5,446,344 issued to Yoshikazu Kanazawa of Fujitsu and Shinoda et al 500 referenced above. ADS has become a basic electronic architecture widely used in the AC plasma display industry for the manufacture of monitors and television.

Fujitsu ADS architecture is commercially used by Fujitsu and is also widely used by competing manufacturers including Matsushita and others. ADS is disclosed in U.S. Pat. No. 5,745,086 issued to Weber of Plasmaco and Matsushita. See FIGS. 2, 3, 11 of Weber 086. The ADS method of addressing and sustaining a surface discharge display as disclosed in U.S. Pat. Nos. 5,541,618 and 5,724,054 issued to Shinoda of Fujitsu sustains the entire panel (all rows) after the addressing of the entire panel. The addressing and sustaining are done separately and are not done simultaneously.

An architecture for simultaneously addressing and sustaining is SAS where one section of the PDP is addressed while another section is simultaneously sustained.

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. No. 3,801,861 (Petty et al) and U.S. Pat. No. 3,803,449 (Schmersal). FIGS. 1 and 3 of the Shinoda 054 ADS patent discloses AWD architecture as prior art.

The AWD electronics architecture for addressing and sustaining monochrome PDP has also been adopted for addressing and sustaining multi-color PDP. For example, Samsung Display Devices Co., Ltd., has disclosed AWD and the superimpose of address pulses with the sustain pulse. Samsung specifically labels this as address while display (AWD). See High-Luminance and High-Contrast HDTV PDP with Overlapping Driving Scheme, J. Ryeom et al, pages 743 to 746, Proceedings of the Sixth International Display Workshops, IDW 99, Dec. 1–3, 1999, Sendai, Japan. AWD is also disclosed in U.S. Pat. No. 6,208,081 issued to Yoon-Phil Eo and Jeong-duk Ryeom of Samsung.

LG Electronics Inc. has disclosed a variation of AWD with a Multiple Addressing in a Single Sustain (MASS) in U.S. Pat. No. 6,198,476 issued to Jin-Won Hong et al of LG Electronics. Also see U.S. Pat. No. 5,914,563 issued to Eun-Cheol Lee et al of LG Electronics.

The electronics architecture used in the practice of this invention is ADS as described in Shinoda 618 and 054. Also SAS is contemplated in the practice of this invention. In addition, other architectures as described herein and known in the prior art may be utilized.

Examples of energy recovery architecture and circuits are well known in the prior art. These include U.S. Pat. No. 4,772,884 (Weber et al.) U.S. Pat. No. 4,866,349 (Weber et al.), U.S. Pat. No. 5,081,400 (Weber et al.), U.S. Pat. No. 5,438,290 (Tanaka), U.S. Pat. No. 5,642,018 (Marcotte), U.S. Pat. No. 5,670,974 (Ohba et al.), U.S. Pat. No. 5,808,420 (Rilly et al.) and U.S. Pat. No. 5,828,353 (Kishi et al.), all incorporated herein by reference. These and other energy reduction techniques may be used with the ADS, SAS, or other electronic architectures in the practice of this invention.

Slow rise slopes or ramps may be used in the practice of this invention. The prior art discloses slow rise slopes or ramps for the addressing of AC plasma displays. The early patents include U.S. Pat. Nos. 4,063,131 and 4,087,805 issued to John Miller of Owens-Ill.; U.S. Pat. No. 4,087,807 issued to Joseph Miavecz of Owens-Ill.; and U.S. Pat. Nos. 4,611,203 and 4,683,470 issued to Tony Criscimagna et al of IBM.

An architecture for a slow ramp reset voltage is disclosed in U.S. Pat. No. 5,745,086 issued to Larry F. Weber of Plasmaco and Matsushita, incorporated herein by reference. Weber 086 discloses positive or negative ramp voltages that exhibit a slope that is set to assure that current flow through each display pixel site remains in a positive resistance region of the gas's discharge characteristics. The slow ramp architecture is disclosed in FIG. 11 of Weber 086 in combination with the Fujitsu ADS. PCT Patent Application WO 00/30065 filed by Junichi Hibino et al of Matsushita also discloses architecture for a slow ramp reset voltage and is incorporated herein by reference.

Artifact reduction techniques may be used in the practice of this invention. The PDP industry has used various techniques to reduce motion and visual artifacts in a PDP display. Pioneer of Tokyo, Japan has disclosed a technique called CLEAR for the reduction of false contour and related problems. See Development of New Driving Method for AC-PDPs by Tokunaga et al of Pioneer *Proceedings of the Sixth International Display Workshops*, IDW 99, pages 787–790, Dec. 1–3, 1999, Sendai, Japan. Also see European Patent Applications EP 1 020 838 A1 by Tokunaga et al of Pioneer. The CLEAR technique uses an algorithm and waveform to provide ordered dither gray scale in small increments with few motion or visual artifacts. CLEAR comprises turning on pixels followed by selective erase. The CLEAR techniques disclosed in the above Pioneer IDW publication and Pioneer EP 1020838 A1, are incorporated herein by reference.

In the practice of this invention, it is contemplated that SAS architecture may be combined with a CLEAR or like technique as required for the reduction of notion and visual artifacts. SAS may also be used with the slope ramp address.

SAS in combination with slow ramp allows for a larger number of sustain cycles per frame. This allows for a brighter display or alternatively more subfields per display. This also improves the PDP operating margin (window) due to more time allowed for the various overhead functions. The ADS waveforms may be used with SAS to address one PDP section while sustaining another PDP section.

In the practice of this invention, the tubes may be any suitable volumetric shape or geometric configuration. The cross section as shown in FIG. 1 is rectangular. However, this may be of any geometric cross section including square, circular, elliptical, triangular, polygonal, trapezoid and so forth.

The tubes may be partially or completely embedded within a transparent dielectric such as disclosed in U.S. Pat. No. 3,848,248 (MacIntyre) incorporated herein by reference.

The tubes may be constructed of any suitable material. In one embodiment of this invention, the tubes are made of glass, ceramic, quartz, or like amorphous and/or crystalline materials including mixtures of such.

In other embodiments it is contemplated that the tube may be made of plastic, metal, metalloid, or other such materials including mixtures or combinations thereof.

Glasses made of inorganic compounds of metals and metalloids are contemplated, such as oxides, silicates, borates, and phosphates of titanium, zirconium, hafnium, gallium, silicon, aluminum, lead, zinc, boron, magnesium, and so forth.

In one specific embodiment of this invention, the tube is made of an aluminate silicate glass or contains a layer of aluminate silicate glass. When the ionizable gas mixture contains helium, the aluminate silicate glasses are especially beneficial in preventing the escaping of helium.

It is also contemplated that the tube shell may be made of other glasses including lead silicates, lead phosphates, lead oxides, borosilicates, alkali silicates, aluminum oxides, soda lime glasses, and pure vitreous silica.

For secondary electron emission, a tube may be made in whole or in part from one or more materials such as magnesium oxide having a sufficient Townsend coefficient. These include inorganic compounds of magnesium, calcium, strontium, barium, gallium, lead, and the rare earths especially lanthanum, cerium, actinium, and thorium. The contemplated inorganic compounds include oxides, silicates, nitrides, carbides, borides, and other inorganic compounds of the above and other elements.

The use of secondary electron emission materials in a plasma display is disclosed in U.S. Pat. No. 3,716,742 issued to Nakayama et al. The use of Group IIa secondary electron emission compounds including magnesium oxide is disclosed in U.S. Pat. Nos. 3,836,393 and 3,846,171. The use of rare earth compounds for secondary electron emission in an AC plasma display is disclosed in U.S. Pat. Nos. 4,126,807; 4,126,809; and 4,494,038, all issued to Wedding et al. Lead oxide may also be used as a secondary electron emission material, but may darken with age.

In the best embodiment and mode contemplated for the practice of this invention, the secondary electron emission material is magnesium oxide on part or all of the internal surface of a tube. The secondary electron emission material may also be on the external surface. The tube may be made in whole or in part of a secondary electronic material such as magnesium oxide. In one embodiment, the tube contains a layer of secondary electron material such as magnesium oxide on the inside wall or walls of the tube. This layer may be continuous or discontinuous and may be added during or after the tube manufacture. A secondary electron material may also be dispersed or suspended as particles within the ionizable gas. As disclosed hereinafter, phosphor particles may also be dispersed or suspended in the gas, or may be affixed to the inner or external surface of the tube. The secondary electron material and/or the phosphor can be introduced into the gas by flowing the gas through a fluidized bed containing the secondary electron material or phosphor.

The hollow tube(s) as used in the practice of this invention contain(s) one or more ionizable gas components. As used herein, ionizable gas or gas means one or more gas components. In the practice of this invention, the gas is typically selected from a mixture of the rare gases of neon, argon, xenon, krypton, helium, and/or radon. The rare gas may be a Penning gas mixture. Other gases are contemplated including nitrogen, $CO_2$, mercury, halogens, excimers, oxygen, hydrogen, and tridium ($T^3$).

In one embodiment, a two-component gas mixture (or composition) is used such as a mixture of argon and xenon, argon and helium, xenon and helium, neon and argon, neon and xenon, neon and helium, and neon and krypton.

Specific two-component gas mixtures (compositions) include about 5 to 90% atoms of argon with the balance xenon.

Another two-component gas mixture is a mother gas of neon containing 0.05 to 15% atoms of xenon, argon, or krypton. This can also be a three-component, four-component gas, or five-component gas by using small quantities of an additional gas or gases selected from xenon, argon, krypton, and/or helium.

In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon.

U.S. Pat. No. 4,081,712 (Bode et al), incorporated by reference, discloses the addition of helium to a gaseous medium of 90 to 99.99% atoms of neon and 10 to 0.01% atoms of argon, xenon, and/or krypton.

In one embodiment there is used a high concentration of helium with the balance selected from one or more gases of neon, argon, xenon, and nitrogen as disclosed in U.S. Pat. No. 6,285,129 (Park) and incorporated herein by reference. A high concentration of xenon may also be used with one or more other gases as disclosed in U.S. Pat. No. 5,770,921 (Aoki et al), incorporated herein by reference.

In the prior art, gas discharge (plasma) displays are operated with the ionizable gas at a pressure below atmospheric. Gas pressures above atmospheric are not used because of structural problems. Higher gas pressures above atmospheric may cause the display substrates to separate, especially at elevations of 4000 feet or more above sea level. Such separation may also occur between a substrate and a viewing envelope or dome in a single substrate or monolithic plasma panel structure described hereinafter.

The gas pressure inside of the hollow tube may be equal to or less than atmospheric, about 150 to about 760 Torr, typically about 350 to about 650 Torr.

Pressures above atmospheric may be used depending upon the structural integrity of the tube. In one embodiment of this invention, the gas pressure inside of the tube is equal to or greater than atmospheric. Depending upon the structural strength of the tube, the pressure above atmospheric may be about 1 to about 250 atmospheres (760 to 190,000 Torr) or greater. Higher gas pressures increase the luminous efficiency of the plasma display.

In some embodiments, it is contemplated that the gas pressure in one tube(s) is equal to or greater than atmospheric pressure while the gas pressure in other tube(s) is equal to or less than atmospheric pressure.

The gas pressure inside each tube may be optimized for the gas composition and/or for the excitation of a selected phosphor. Thus the gas composition and gas pressure may be different for each tube and for each selected phosphor.

One or more tubes is positioned inside of a gas discharge (plasma) display device. As disclosed and illustrated in the gas discharge display patents cited above and incorporated herein by reference, the tubes may be positioned in one or more channels or grooves of a plasma display structure as disclosed in Shinoda 500, 553, or Wedding 158. The tubes may also be positioned within an etched cavity, well, or hollow of a plasma display structure as disclosed by Knauer 186. In this embodiment, one or more hollow tubes containing the ionizable gas is located within the display panel structure in close proximity to opposing electrodes.

The electrodes may be of any geometric shape or configuration. In one embodiment the electrodes are opposing arrays of electrodes, one array of electrodes being transverse or orthogonal to an opposing array of electrodes. The electrode in each opposing array can be parallel, zig zag, serpentine, or like pattern as typically used in dot-matrix gas discharge (plasma) displays. The use of split or divided electrodes or electrodes with windows or openings is contemplated as disclosed in U.S. Pat. No. 3,603,836 (Grier). These are also referred to as ladder electrodes comprising two or more parallel electrodes with connecting crossovers. The electrodes are of any suitable conductive metal or alloy including gold, silver, aluminum, or chrome-copper chrome. If a transparent electrode is used on the viewing surface, this is typically indium tin oxide (ITO) or tin oxide with a conductive side or edge bus bar of silver. Other conductive bus bar materials may be used such as gold, aluminium, or chrome-copper-chrome.

The electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. At least one hollow tube containing ionizable gas is positioned in the gas discharge (plasma) display device at the intersection of two opposing electrodes. When an appropriate voltage potential is applied to an opposing pair of electrodes, the ionizable gas inside of the tube at the crossover is energized and a gas discharge occurs. Photons of light in the visible and/or invisible range are emitted by the gas discharge. Neon produces visible light (neon orange) whereas the other rare gases emit light in the non-visible ultraviolet range.

The photons of light pass through the shell or wall of the tube and excite a phosphor located outside of the tube. This phosphor may be located on the side wall(s) of the channel, groove, cavity, well, hollow or like structure of the discharge space. In the best embodiment and mode contemplated in the practice of this invention, a layer, coating, or particles of phosphor is located on or near the exterior wall of the tube as shown in the drawings.

The gas discharge within the channel, groove, cavity, well or hollow produces photons that excite the phosphor such that the phosphor emits light in a range visible to the human eye. Typically this is red, blue, or green light. However, phosphors may be used which emit other light such as white, pink or yellow light. In some applications of this invention, the emitted light may not be visible to the human eye.

In prior art AC plasma displays as disclosed in Wedding 158, the phosphor is located on the wall(s) or side(s) of the barriers that form the channel, groove, cavity, well, or hollow, The phosphor may also be located on the bottom of the channel, or groove as disclosed by Shinoda et al 500 or the bottom cavity, well, or hollow as disclosed by Knauer et al 186.

In one embodiment of this invention, tubes are positioned within the channel, groove, cavity, well, or hollow, such that photons from the gas discharge within the tube causes the phosphor along the wall(s), side(s) or at the bottom of the channel, groove, cavity, well, or hollow, to emit light.

In another embodiment of this invention, phosphor is located near or on the outside surface of each tube as shown in FIG. 1. In this embodiment, the outside surface is at least partially covered with phosphor that emits light when excited by photons from the gas discharge within the tube.

In one embodiment, phosphor particles are dispersed and/or suspended within the ionizable gas inside each tube. In such embodiment the phosphor particles are sufficiently small such that most of the phosphor particles remain suspended within the gas and do not precipitate or otherwise substantially collect on the inside wall of the tube. The mean diameter of the dispersed and/or suspended phosphor particles is less than about 1 micron, typically less than 0.1 microns. Larger particles can be used depending on the size of the microsphere.

In the practice of this invention the tube may be color tinted or constructed of materials that are color tinted with red, blue, green, yellow, or like pigments. This is disclosed in U.S. Pat. No. 4,035,690 (Roeber), incorporated herein by reference. The gas discharge may also emit color light of different wavelengths as disclosed in Roeber 690.

The use of tinted materials and/or gas discharges emitting light of different wavelengths may be customized for each tube and used in combination with the above described phosphors and the light emitted therefrom. Optical filters may also be used.

The present gas filling techniques used in the manufacture of gas discharge (plasma) display devices comprise introducing the gas mixture through an aperture into the device. This is a gas injection hole. The manufacture steps typically include heating and baking out the assembled device (before gas fill) at a high-elevated temperature under vacuum for 2 to 12 hours. The vacuum is obtained via external suction through a connecting conduit inserted in the aperture. The bake out is followed by back fill of the device with an ionizable gas introduced through the conduit and aperture. The conduit and aperture are then sealed-off.

This bake out and gas fill process is the major production bottleneck in the manufacture of gas discharge (plasma) display devices, requiring substantial capital equipment and a large amount of process time. For color AC plasma display panels of 40 to 50 inches in diameter, the bake out and vacuum cycle may be up to 30 hours per panel or over 30 million hours per year for a manufacture facility producing over 1 million plasma display panels per year.

The gas-filled tubes used in this invention can be produced in large economical volumes and added to the gas discharge (plasma) display device without the necessity of bake out and gas process capital equipment. The savings in capital equipment cost and operations costs are substantial.

In one embodiment, the tubes are conveniently added to the gas discharge space between opposing electrodes before the device is sealed. An aperture and tube can be used for bake out if desired, but the costly gas fill operation is eliminated.

The presence of the tubes inside of the display device add structural support and integrity to the device. The present color AC plasma displays of 40 to 50 inches are fragile and are subject to breakage during shipment and handling.

The size and shape of the tubes used in the practice of this invention may vary over a wide range. As disclosed above, the tubes may be of any suitable geometric form, shape or cross section including rectangular, square, circular, elliptical, triangular, polygonal, trapezoid, and so forth. As used herein, tube means any suitable geometric cross section and is not limited to any particular cross section.

As used herein, the tube width is the viewing width of the tube from the top or bottom (front or rear) of the display. In a circular cross section tube, the tube diameter is the same as the width in a tube with a cross section which is rectangular, square, triangular, polygonal, trapezoidal, or the like. In a gas discharge display, the average external width of a tube is about 5 mils to 30 mils or greater (where one mil equals 0.001 inch) or about 125 microns to 750 microns. Tubes can be manufactured up to 80 mils (about 2000 microns) in external width or greater. The thickness of the wall of each hollow tube must be sufficient to retain the gas inside, but thin enough to allow passage of photons emitted by the gas discharge. The wall thickness of tubes should be kept as thin as practical to minimize ultraviolet (UV) absorption, but thick enough to retain sufficient strength so that the tubes can be easily handled and pressurized. The tube wall thickness should be about 1 to 15% of external width for the tube.

The length of each tube may vary depending upon the PDP structure. In one embodiment hereof, an elongated tube is selectively divided into a multiplicity of lengths in the shape or form of micro-size cylinders for gas discharge display units. In one embodiment, the PDP is comprised of a multiplicity of parallel tubes. In another embodiment, the PDP is comprised of a continuous single tube which winds or weaves back and forth from one end to the other end of the PDP.

The size and shape of the tubes may be varied for different phosphors. Thus for a gas discharge display having phosphors which emit red, green, and blue light in the visible range, the tubes for the red phosphor may have an average width of less than the average width of the tubes for the green or blue phosphor. Typically the average diameter of the red phosphor tubes is about 80 to 95% of the average diameter of the green phosphor tubes.

The average width of the blue phosphor tubes may be greater than the average width of the red or green phosphor tubes. Typically the average tube width for the blue phosphor is about 105 to 125% of the average tube width for the green phosphor and about 110 to 155% of the average width of the red phosphor.

In another embodiment using a high brightness green phosphor, the red and green tubes may be reversed such that the average width of the green phosphor tubes is about 80 to 95% of the average width of the red phosphor tube. In this embodiment, the average width of the blue phosphor tube is 105 to 125% of the average tube width for the red phosphor tube and about 110 to 155% of the average width of the green phosphor tube.

The red, green, and blue tubes may also have different size widths so as to enlarge voltage margin and improve luminance uniformity as disclosed in US Patent Application Publication 2002/0041157 A1 (Heo), incorporated herein by reference. The widths of the corresponding electrodes for each RBG tube may also be of different dimensions such that a particular electrode is wider or more narrow for a selected phosphor as disclosed in U.S. Pat. No. 6,034,657 (Tokunaga et al), incorporated herein by reference.

In addition the geometric cross section shape of the tube for each phosphor may be customized for the particular phosphor. Thus, there may be a different cross sectional shape for each phosphor, i.e., red, green, and blue.

Photoluminescent phosphor may be located on all or part of the external surface of the tube or on all or part of the internal surface of the tube. The phosphor may also be particles dispersed or floating within the gas. In the best embodiment contemplated for the practice of this invention, the phosphor is on the external surface of the tube.

The photoluminescent phosphor is excited by ultraviolet (UV) photons from the gas discharge and emits light in the visible range such as red, blue, or green light. Phosphors may be selected to emit light of other colors such as white, pink or yellow. The phosphor may also be selected to emit light in non-visible ranges of the spectrum. Optical filters may be selected and matched with different phosphors.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, $CdS:Al_2$, $Cd_2O_2S$:Tb, and $Y_2O_2S$:Tb.

In one mode and embodiment of this invention using a green light-emitting phosphor, there is used a green light-emitting phosphor selected from the zinc orthosilicate phosphors such as $ZnSiO_4$:$Mn^{2+}$. Green light emitting zinc orthosilicates including the method of preparation are disclosed in U.S. Pat. No. 5,985,176 (Rao) which is incorporated herein by reference. These phosphors have a broad emission in the green region when excited by 147 nm and 173 nm (nanometers) radiation from the discharge of a xenon gas mixture.

In another mode and embodiment of this invention there is used a green light-emitting phosphor which is a terbium activated yttrium gadolinium borate phosphor such as (Gd, Y) $BO_3$:$Tb^{3+}$. Green light-emitting borate phosphors including the method of preparation are disclosed in U.S. Pat. No. 6,004,481 (Rao) which is incorporated herein by reference.

In another mode and embodiment there is used a manganese activated alkaline earth aluminate green phosphor as disclosed in U.S. Pat. No. 6,423,248 (Rao), peaking at 516 nm when excited by 147 and 173 nm radiation from xenon. The particle size ranges form 0.05 to 5 microns. Rao 248 is incorporated herein by reference Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated.

Green light-emitting terbium-activated lanthanum cerium orthophosphate phosphors are disclosed in U.S. Pat. No. 4,423,349 (Nakajima et al) which is incorporated herein by reference. Green light-emitting lanthanum cerium terbium phosphate phosphors are disclosed in U.S. Pat. No. 5,651, 920 which is incorporated herein by reference.

Green light-emitting phosphors may also be selected form the trivalent rare earth ion-containing aluminate phosphors as disclosed in U.S. Pat. No. 6,290,875 (Oshio et al).

Blue Phosphor

A blue light-emitting phosphor may be used alone or in combination with other light-emitting phosphors such as green or red. Phosphor materials which emit blue light include ZnS:Ag, ZnS:Cl, and CsI:Na.

In a preferred mode and embodiment of this invention, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}$:$Eu^{2+}$. BAM is widely used as a blue phosphor in the PDP industry.

BAM and other aluminate phosphors which emit blue visible light are disclosed in U.S. Pat. No. 5,611,959 (Kijima et al) and U.S. Pat. No. 5,998,047 (Bechtel et al), both incorporated herein by reference. The aluminate phosphors may also be selectively coated as disclosed by Bechtel et al. 047.

Blue light-emitting phosphors may be selected from a number of divalent europium-activated aluminates such as disclosed in U.S. Pat. No. 6,096,243 (Oshio et al) incorporated herein by reference.

In another mode and embodiment of this invention, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao) which is incorporated herein by reference.

In a best mode and embodiment of this invention using a blue-emitting phosphor, a mixture or blend of blue emitting phosphors is used such as a blend or complex of about 85 to 70% by weight of a lanthanum phosphate phosphor activated by trivalent thulium ($Tm^{3+}$), $Li^+$, and an optional amount of an alkaline earth element ($AE^{2+}$) as a coactivator and about 15 to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference.

Blue light-emitting phosphors also include $ZnO.Ga_2O_3$ doped with Na or Bi. The preparation of these phosphors is disclosed in U.S. Pat. No. 6,217,795 (Yu et al) and U.S. Pat. No. 6,322,725 (Yu et al), both incorporated herein by reference.

Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S:Eu$ and $Y_2O_3S:Eu$.

In a best mode and embodiment of this invention using a red-emitting phosphor, there is used a red light-emitting phosphor which is an europium activated yttrium gadolinium borate phosphors such as $(Y,Gd)BO_3:Eu^{3+}$ The composition and preparation of these red-emitting borate phosphors is disclosed in U.S. Pat. No. 6,042,747 (Rao) and U.S. Pat. No. 6,284,155 (Rao), both incorporated herein by reference.

These europium activated yttrium, gadolinium borate phosphors emit an orange line at 593 nm and red emission lines at 611 and 627 nm when excited by 147 nm and 173 nm UV radiation from the discharge of a xenon gas mixture. For television (TV) applications, it is preferred to have only the red emission lines (611 and 627 nm). The orange line (593 nm) may be minimized or eliminated with an external optical filter.

A wide range of red-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter.

Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$.

White-emitting phosphors are disclosed in U.S. Pat. No. 6,200,496 (Park et al) incorporated herein by reference.

Pink-emitting phosphors are disclosed in U.S. Pat. No. 6,200,497 (Park et al) incorporated herein by reference. Phosphor material which emits yellow light include ZnS:Au.

In one embodiment of this invention it is contemplated using a phosphor to convert infrared radiation to visible light. This is referred to in the literature as an up-conversion phosphor. The up-conversion phosphor is typically used as a layer in combination with a phosphor which converts UV radiation to visible light.

An up-conversion phosphor is disclosed in U.S. Pat. No. 6,265,825 (Asano) incorporated herein by reference.

The phosphor thickness is sufficient to absorb the UV, but thin enough to emit light with minimum attenuation. Typically the phosphor thickness is about 2 to 40 microns, preferably about 5 to 15 microns.

The dispersed or floating particles within the gas are typically spherical or needle shaped having an average size of about 0.01 to 5 microns.

The photoluminescent phosphor is excited by UV in the range of 50 to 400 nanometers. The phosphor may have a protective layer or coating which is transmissive to the excitation UV and the emitted visible light. Such include aluminium oxide or silica. Protective coatings are disclosed in Wedding 158.

In the prior art, it is necessary to select an ionizable gas mixture and gas pressure that is optimum for all phosphors used in the device such as red, blue, and green phosphors. However, this requires trade-offs because a particular gas composition may be optimum for a particular green phosphor, but less desirable for red or blue phosphors. In addition, trade-offs are required for the gas pressure. Because the ionizable gas is contained within a multiplicity of tubes, it is possible to provide a custom gas composition at a custom pressure in each tube for each phosphor.

In the practice of this invention, an optimum gas mixture and an optimum gas pressure may be provided for each of the selected phosphors. Thus the gas mixture and gas pressure inside the tubes may be optimized with a custom gas mixture and a custom gas pressure, each or both optimized for each phosphor emitting red, blue, green, white, pink, or yellow light. The tube width and the wall thickness of the tube can also be adjusted and optimized for each phosphor. Depending upon the Paschen Curve (pd v. voltage) for the ionizable gas mixture, the operating voltage may be decreased by optimized changes in the pressure and tube width.

This invention has been described with reference to a plasma display panel structure having a so-called single substrate or monolithic plasma display panel structure have a one substrate with or without a top or front viewing envelope or dome. Single-substrate or monolithic plasma display panels structures are well known in the prior art and are disclosed by U.S. Pat. No. 3,646,384 (Lay), U.S. Pat. No. 3,806,846 (Mayer) U.S. Pat. No. 3,964,050 Mayer), and other US patents, all cited above and incorporated herein by reference.

In the practice of this invention, the substrate may be formed from glass, plastic, metal, or any other suitable material. Typically glass or metal substrates have been used to provide a rigid display. In one embodiment hereof there is provided a flexible or bendable display device with a flexible substrate.

For a flexible substrate, the material may be plastic or polymer. Flexible substrates may be formed from Mylar® or Kapton® which are trademark materials marketed by duPont.

In one embodiment of this invention, the tubes are positioned within a single-substrate or monolithic gas discharge structure that has a flexible or bendable substrate.

The practice of this invention is not limited to flat surface displays. The tubes may be positioned or located on a conformal surface or substrate so as to conform to a predetermined shape such as a curved surface, round shape, or multiple sides.

In the practice of this invention, the tubes may be positioned and spaced in an AC gas discharge plasma display structure so as to utilize and take advantage of the positive column of the gas discharge. The positive column is described in U.S. Pat. No. 6,184,848 (Weber) and is incorporated herein by reference.

The tubes may be sprayed, stamped, pressed, poured, screen-printed, or otherwise applied to a surface. The surface may contain an adhesive or sticky surface.

Aspects of this invention may also be practiced with a coplanar or opposing substrate PDP as disclosed in Wedding 158 and Shinoda et al 500 discussed above.

Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge.

The tubes may contain a gaseous mixture for a gas discharge display or may contain other substances such as electroluminescent (EL) or liquid crystal materials for practice with other displays technologies including electroluminescent displays (ELD), liquid crystal displays (LCD), field emission displays (FED), electrophoretic displays, vacuum fluorescent displays and organic EL or organic LED (OLED) displays.

The use of tubes on a single flexible substrate allows the encapsulated pixel display device to be utilized in a number of applications. In one application, the device is used as a plasma shield to absorb electromagnetic radiation and to make the shielded object invisible to enemy radar. In this embodiment, a flexible sheet of tubes may be provided as a blanket over the shielded object.

As disclosed herein, this invention is not to be limited to the exact forms shown and described because changes and modifications may be made by one skilled in the art within the scope of the following claims.

The invention claimed is:

1. In a plasma display comprising a multiplicity of gas discharge pixels, each pixel being in electrical contact with two or more electrodes, the improvement wherein the display comprises a multiplicity of elongated gas filled tubes; positioned on a flexible substrate, each tube being in contact with the electrodes and each gas discharge pixel being confined within one of said multiplicity of elongated tubes, said electrodes being arranged to provide positive column gas discharge within each said elongated tube.

2. The invention of claim 1 wherein each of said multiplicity of elongated tubes contains a gas composition that produces photons in the UV range during said positive column gas discharge.

3. The invention of claim 2 wherein each of said multiplicity of elongated tubes is composed of UV transmissive material.

4. The invention of claim 3 wherein a photoluminescent phosphor is located in close proximity to each of said multiplicity of elongated tubes, said phosphor emitting light when excited by UV from a positive column gas discharge within a tube.

5. The invention of claim 1 wherein the display contains a photoluminescent phosphor on or near each tube, said phosphor emitting light when excited by photons from the positive column discharge of the gas within a tube.

6. The invention of claim 5 wherein the gas composition in each tube is selected for optimum photon excitation of the phosphor during positive column gas discharge.

7. The invention of claim 5 wherein the pressure of the gas inside each tube is optimized for excitation of the phosphor.

8. The invention of claim 1 wherein phosphor is located near or on the external surface of each tube.

9. The invention of claim 1 wherein the gas is at a pressure equal to or below about 760 Torr.

10. The invention of claim 1 wherein the gas is at a pressure equal to or above about 760 Torr.

11. The invention of claim 1 wherein a source of secondary electron emission is provided inside of each tube.

12. The invention of claim 1 wherein each tube has an internal and external surface, the internal surface of each tube containing a secondary electron emission material.

13. The invention of claim 12 wherein the secondary electron emission material is magnesium oxide.

14. A single substrate plasma display containing a multiplicity of ionizable gas filled tubes and two or more electrodes in electrical contact with each tube, said electrodes defining a multiplicity of positive column gas discharge pixels confined within each tube.

15. The invention of claim 14 wherein one or more tubes contains a gas composition that produces light in the UV range during gas discharge.

16. The invention of claim 15 wherein each tube is composed of UV transmissive material.

17. The invention of claim 16 wherein a photoluminescent phosphor is located in close proximity to each tube, said phosphor emitting light when excited by UV from a gas discharge within a tube.

18. The invention of claim 14 wherein the substrate contains one or more phosphors which emit light when exited by photons from the discharge of the gas within a tube.

19. The invention of claim 18 wherein the composition of the gas inside of the tube is selected for optimum excitation of the phosphor during gas discharge.

20. The invention of claim 18 wherein the pressure of the gas inside the tube is selected for optimum excitation of the phosphor during gas discharge.

21. The invention of claim 14 wherein phosphor is located near or on the external surface of each tube.

22. The invention of claim 14 wherein the gas is at a pressure equal to or below about 760 Torr.

23. The invention of claim 14 wherein the gas is at a pressure equal to or above about 760 Torr.

24. The invention of claim 14 wherein a source of secondary electron emission is provided inside of the tube.

25. The invention of claim 14 wherein each tube has an internal and external surface, the internal surface of the tube containing a secondary electron emission material.

26. The invention of claim 25 wherein the secondary electron emission material is magnesium oxide.

27. A positive column AC gas plasma display device comprising a plurality of elongated tubes, each tube containing an ionizable gas which produces light during gas discharge, each tube having a transparent electrode on its top viewing side, each tube being attached on its bottom side to a substrate containing an array of electrodes, said array of electrodes being arranged in pairs to produce a ping-pong effect between electrodes during gas discharge so as to produce positive column discharge zones along the length of each tube.

28. The invention of claim 27 wherein the gas discharge produces light photons in the ultraviolet (UV) range.

29. The invention of claim 28 wherein each tube is made of a UV transmissive material.

30. The invention of claim 29 wherein each tube contains a phosphor which emits red, blue, or green light when exited by UV photons from the discharge of the gas within the tube.

31. The invention of claims 30 wherein phosphor is deposited on at least a portion of the external surface of at least one tube.

32. The invention of claim 31 wherein the gas pressure of the gas inside of each tube is optimized for the excitation of the phosphor during gas discharge.

33. The invention of claims 31 wherein the gas composition in each tube is selected for optimum excitation of the phosphor during gas discharge.

34. The invention of claim 33 wherein the ionizable gas contains phosphor particles.

35. The invention of claim 27 wherein the gas is at a pressure equal to or below 760 Torr.

36. The invention of claim 27 wherein the gas is at a pressure equal to or above 760 Torr.

37. The invention of claim 27 wherein a source of secondary electron emission is provided inside of each tube.

38. The invention of claim 27 wherein the inside surface of each tube contains a secondary electron emission material.

39. The invention of claim 38 wherein the secondary electron emission material is magnesium oxide.

40. The invention of claim 38 wherein the secondary electron emission material is present as a continuous or discontinuous layer.

41. The invention of claim 27 wherein the gas inside of each tube contains particles of a secondary electron emission material.

42. The invention of claim 27 wherein the elongated tubes have a cross-sectional shape that is rectangular, square, triangular, polygonal, trapezoidal, circular or elliptical.

* * * * *